United States Patent
Su et al.

(10) Patent No.: US 10,716,059 B2
(45) Date of Patent: Jul. 14, 2020

(54) INTELLIGENT PLMN SELECTION FOR LINK BUDGET LIMITED WIRELESS DEVICES

(71) Applicant: Apple Inc., Cupertino, CA (US)

(72) Inventors: Li Su, San Jose, CA (US); Ozgur Ekici, Ottawa (CA); Sachin J. Sane, Santa Clara, CA (US); Madhusudan Chaudhary, Campbell, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 15/202,257

(22) Filed: Jul. 5, 2016

(65) Prior Publication Data

US 2017/0019846 A1    Jan. 19, 2017

Related U.S. Application Data

(60) Provisional application No. 62/193,520, filed on Jul. 16, 2015.

(51) Int. Cl.
| | |
|---|---|
| *H04W 48/18* | (2009.01) |
| *H04J 11/00* | (2006.01) |
| *H04L 29/06* | (2006.01) |
| *H04B 1/3827* | (2015.01) |
| *H04B 17/318* | (2015.01) |

(Continued)

(52) U.S. Cl.
CPC ............ *H04W 48/18* (2013.01); *H04B 1/385* (2013.01); *H04J 11/0069* (2013.01); *H04L 63/0853* (2013.01); *H04B 17/318* (2015.01); *H04W 84/042* (2013.01)

(58) Field of Classification Search
None
See application file for complete search history.

(56) References Cited

U.S. PATENT DOCUMENTS

| | | | |
|---|---|---|---|
| 2009/0088160 A1* | 4/2009 | Pani | H04W 36/30 455/436 |
| 2010/0075665 A1* | 3/2010 | Nader | H04J 11/0093 455/426.1 |

(Continued)

FOREIGN PATENT DOCUMENTS

WO    WO2014148969 A1    9/2014

*Primary Examiner* — Gregory B Sefcheck
*Assistant Examiner* — Suk Jin Kang
(74) *Attorney, Agent, or Firm* — Kowert, Hood, Munyon, Rankin & Goetzel, P.C.

(57) ABSTRACT

Techniques for a link budget limited UE to improve communications performance with cellular networks are disclosed. The UE may be associated with subscriptions to multiple carriers and may connect to a cell of a first carrier. The UE may detect that received signal strength from the cell is below a threshold and search for a new cell that may be of a different carrier. The UE may store a PLMN eSIM priority look up table and the search may be based on the look up table. Additionally, the UE may track received signal strength and geographic location in a first data structure that the UE may send to a server. The UE may receive a second data structure from the server that includes received signal strength at geographic locations compiled from a plurality of UEs, including the UE. The UE may also use the second data structure in searches for a new cell.

20 Claims, 12 Drawing Sheets

(51) Int. Cl.
*H04W 84/02* (2009.01)
*H04W 84/04* (2009.01)

(56) References Cited

U.S. PATENT DOCUMENTS

| | | | | |
|---|---|---|---|---|
| 2010/0311402 A1* | 12/2010 | Srinivasan | H04W 8/183 | 455/418 |
| 2010/0311404 A1* | 12/2010 | Shi | H04W 8/205 | 455/419 |
| 2010/0311444 A1* | 12/2010 | Shi | H04W 4/50 | 455/466 |
| 2011/0092208 A1* | 4/2011 | Swaminathan | H04W 36/385 | 455/435.3 |
| 2011/0176430 A1* | 7/2011 | Zetterberg | H04L 43/16 | 370/242 |
| 2012/0309391 A1* | 12/2012 | Zhang | H04W 48/16 | 455/432.1 |
| 2013/0070679 A1* | 3/2013 | Wegmann | H04W 36/0083 | 370/328 |
| 2013/0150054 A1* | 6/2013 | Axmon | H04W 36/32 | 455/440 |
| 2013/0231111 A1* | 9/2013 | Ito | H04W 48/16 | 455/434 |
| 2013/0252614 A1 | 9/2013 | Hsu et al. | | |
| 2013/0260757 A1* | 10/2013 | Deivasigamani | H04W 24/00 | 455/435.3 |
| 2013/0324107 A1 | 12/2013 | Lindoff et al. | | |
| 2014/0329526 A1 | 11/2014 | Sundararajan et al. | | |
| 2015/0036663 A1* | 2/2015 | Kilpatrick, II | H04W 36/245 | 370/332 |
| 2015/0038140 A1* | 2/2015 | Kilpatrick, II | H04W 64/00 | 455/436 |
| 2015/0038143 A1* | 2/2015 | Kilpatrick, II | H04W 64/00 | 455/436 |
| 2015/0038180 A1* | 2/2015 | Quick, Jr. | H04W 64/00 | 455/458 |
| 2015/0049737 A1* | 2/2015 | Yang | H04W 36/30 | 370/332 |
| 2015/0094069 A1* | 4/2015 | Gopal | H04W 36/0066 | 455/437 |
| 2015/0119043 A1* | 4/2015 | Gopal | H04W 36/0061 | 455/437 |
| 2015/0215901 A1* | 7/2015 | Lee | H04W 72/02 | 455/41.2 |
| 2015/0271718 A1* | 9/2015 | Gopal | H04W 36/0088 | 455/436 |
| 2015/0289189 A1* | 10/2015 | Yang | H04W 36/30 | 455/437 |
| 2015/0296520 A1* | 10/2015 | Batchu | H04W 72/0493 | 455/434 |
| 2015/0341825 A1* | 11/2015 | Soriaga | H04W 28/0215 | 455/450 |
| 2015/0350973 A1* | 12/2015 | Yang | H04W 48/18 | 455/437 |
| 2016/0014666 A1* | 1/2016 | Muller | H04W 36/165 | 455/436 |
| 2016/0037388 A1* | 2/2016 | Yang | H04W 36/34 | 370/332 |
| 2016/0057686 A1* | 2/2016 | Yang | H04W 36/0016 | 370/332 |
| 2016/0080951 A1* | 3/2016 | Lindoff | H04W 28/02 | 455/418 |
| 2016/0088465 A1* | 3/2016 | Golla | H04W 72/0493 | 455/450 |
| 2016/0150350 A1* | 5/2016 | Ingale | H04W 4/70 | 370/255 |
| 2016/0219489 A1* | 7/2016 | Ben Ami | H04W 36/0083 | |
| 2016/0302114 A1* | 10/2016 | Jain | H04W 36/0083 | |
| 2016/0353330 A1* | 12/2016 | Naik | H04W 36/0022 | |
| 2017/0013606 A1* | 1/2017 | Soriaga | H04W 28/0215 | |
| 2017/0048855 A1* | 2/2017 | Garg | H04L 43/16 | |
| 2017/0134932 A1* | 5/2017 | Park | H04W 12/04 | |
| 2017/0164184 A1* | 6/2017 | Borse | H04L 67/306 | |
| 2017/0332274 A1* | 11/2017 | Link, II | H04L 47/2441 | |
| 2017/0359765 A1* | 12/2017 | Chincholi | H04L 5/0048 | |
| 2017/0367000 A1* | 12/2017 | Pragada | H04W 36/0083 | |
| 2018/0192335 A1* | 7/2018 | Bontu | H04W 36/0061 | |
| 2018/0367984 A1* | 12/2018 | Park | H04W 12/04 | |

* cited by examiner

INTELLIGENT PLMN SELECTION FOR LINK BUDGET LIMITED WIRELESS DEVICES

PRIORITY DATA

This application claims benefit of priority to U.S. Provisional Application Ser. No. 62/193,520, titled "Intelligent PLMN Selection for Link Budget Limited Wireless Devices", filed Jul. 16, 2015 by Li Su, Ozgur Ekici, Sachin J. Sane, Madhusudan Chaudhary, and Jianxiong Shi, which is hereby incorporated by reference in its entirety as though fully and completely set forth herein.

FIELD

The present application relates to wireless devices, and more particularly to an apparatus, system, and method for providing improved packet-switched communication services for link budget limited wireless devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to device design, device size, battery size, current transmission medium conditions, and/or other factors) may be referred to in some instances as "link budget limited" devices. It would be desirable to provide improved packet switched wireless communication services to various types of mobile devices, including link budget limited devices.

SUMMARY

Embodiments are presented herein of methods for providing improved packet-switched wireless communication performance for link budget limited devices, and of devices (e.g., wireless devices (UEs), base stations) configured to implement the methods. For example, embodiments presented herein may provide improved LTE or LTE-Advanced performance for link budget limited devices. Some embodiments may relate to a user equipment (UE) that comprises at least one antenna, at least one radio, and a processing element, and which is configured to perform a subset or all of the operations described herein.

According to techniques described herein, the UE (which may be link budget limited) may connect to a base station of a first cell in a first cellular network associated with a first carrier. The UE may be associated with one or more subscriptions to the first carrier and at least one additional carrier. The UE may determine signal strength of a received signal from the first cell is below a first threshold and initiate a search for a second cell. The second cell may be in a second cellular network associated with the at least one additional carrier.

In some embodiments, the UE (which may be link budget limited) may store a public land mobile network (PLMN) eSIM priority look up table (LUT) and sort the priority LUT based at least in part on a PLMN priority order. The UE may update the priority LUT at runtime based at least in part on one or more factors.

According to some embodiments, the UE (which may be link budget limited) may connect to a base station of a host public land mobile network (PLMN) and trigger a packet switched cell reselection in response to the host PLMN dropping below a threshold. The UE may search for a most preferred PLMN that meets an inter-PLMN selection threshold and attempt to connect to the most preferred PLMN.

According to some embodiments, the UE (which may be link budget limited) may track received signal strength from a first cell currently connected to the UE and associate the received signal strength with a geographic location of the UE. The UE may store the associated received signal strength and geographic location in a first data structure and send the first data structure to a server. The UE may receive a second data structure from the server. The second data structure may include received signal strength at geographic locations compiled from a plurality of UEs, including the UE. The UE, in response to detecting that received signal strength from the first cell is below a threshold, may use the geographic location and second data structure to select a second cell and attempt to connect to the second cell. The UE may be associated with a first subscription to the first carrier and a second subscription to the second carrier.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
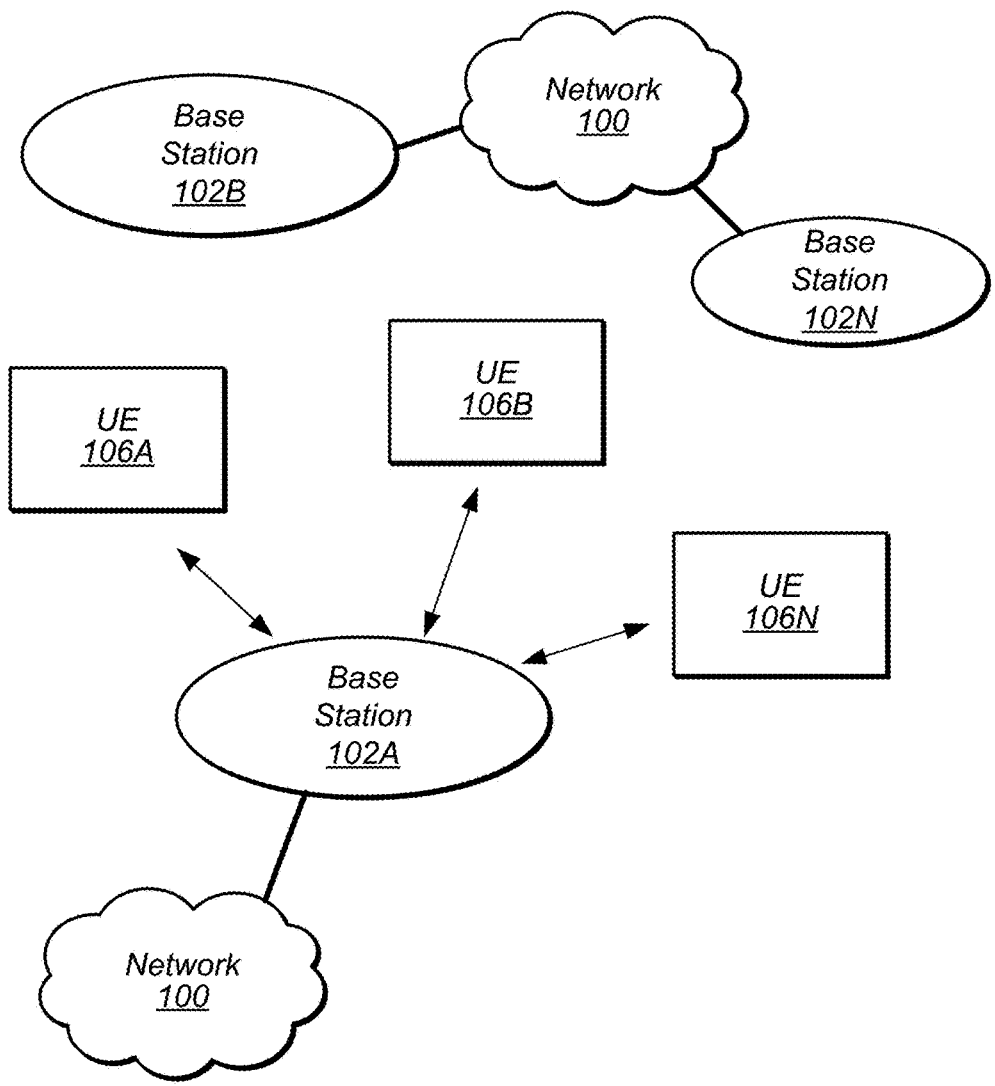
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
UMTS: Universal Mobile Telecommunication System
EUTRA: Evolved UMTS Terrestrial Radio Access
GSM: Global System for Mobile Communications
LTE: Long Term Evolution
PLMN: Public Land Mobile Network
CQI: Channel Quality Indicator
QCI: Quality of Service Class Identifier
GBR: Guaranteed Bit Rate
RAT: Radio Access Technology
RRC: Radio Resource Control
RSRP: Reference Signal Received Power
RSRQ: Reference Signal Received Quality
RX: Receive
RLC: Radio Link Control
RLF: Radio Link Failure
TX: Transmit
UE: User Equipment
UMTS: Universal Mobile Telecommunications System Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
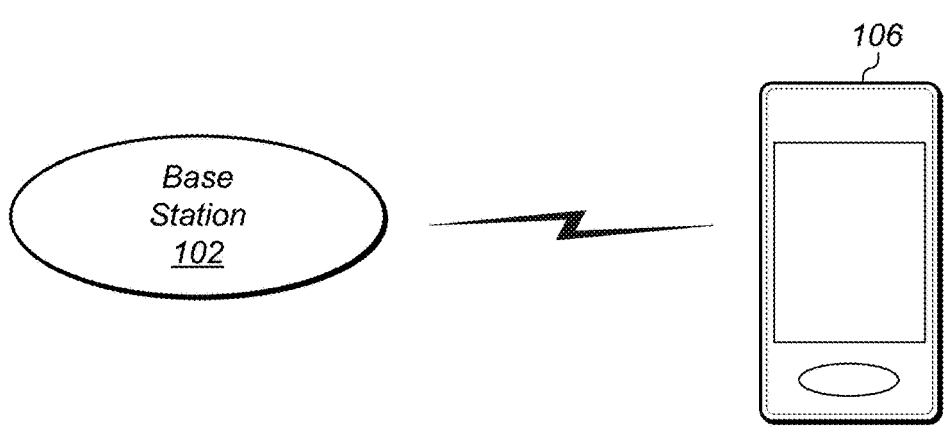
FIG. 2 illustrates an example of a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
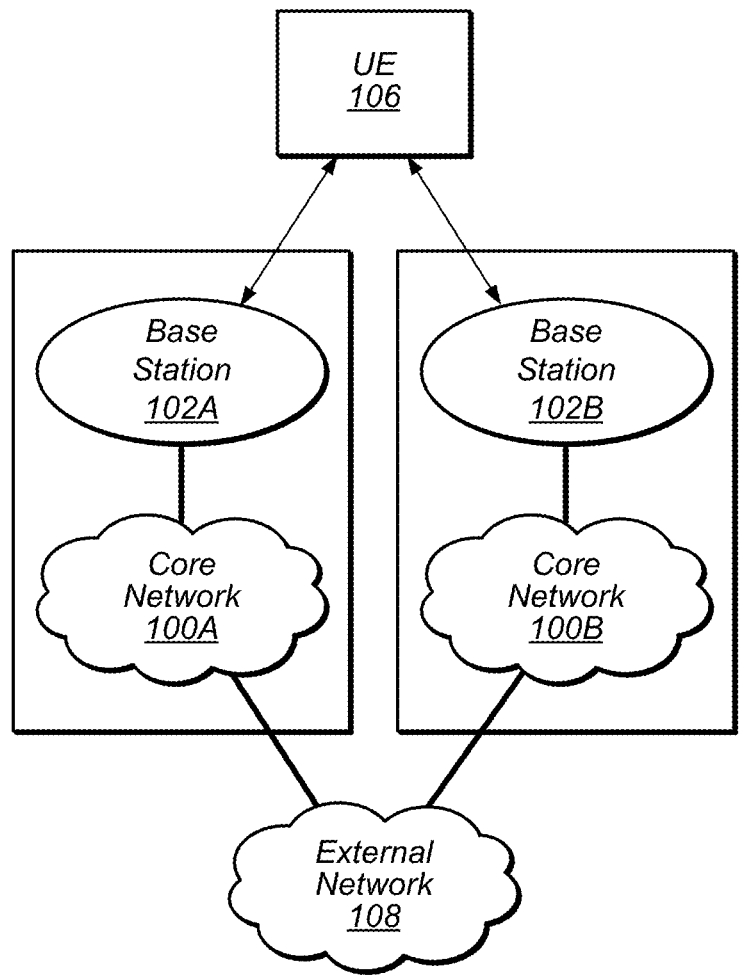
FIG. 3 illustrates an example wireless communication system wherein a UE communicates with two base stations using two different RATs, according to some embodiments.

FIG. 3—Communication System

FIG. 3 illustrates an example simplified wireless communication system, according to some embodiments. It is noted that the system of FIG. 3 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider or cellular carrier, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 3, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In some embodiments, the UE 106 may be configured to use a first RAT that is a packet-switched technology (e.g., LTE) and a second RAT that is a circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN (WiFi), Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

As described further below, different cellular carriers may offer different public land mobile networks (PLMNs) and may provide different coverage area for telecommunication services. For example, a first cellular carrier may provide a first amount of packet-switched cellular coverage (e.g., LTE coverage), a second cellular carrier may provide a second amount of packet-switched cellular coverage (which may be at least partially overlapping), a third cellular carrier may provide a third amount of packet-switched cellular coverage (which may be at least partially overlapping with the first and second carriers), etc. In the United States the four main cellular carriers are Verizon, AT&T, Sprint, and T-Mobile, and various smaller carriers exist as well.

Figure 4:
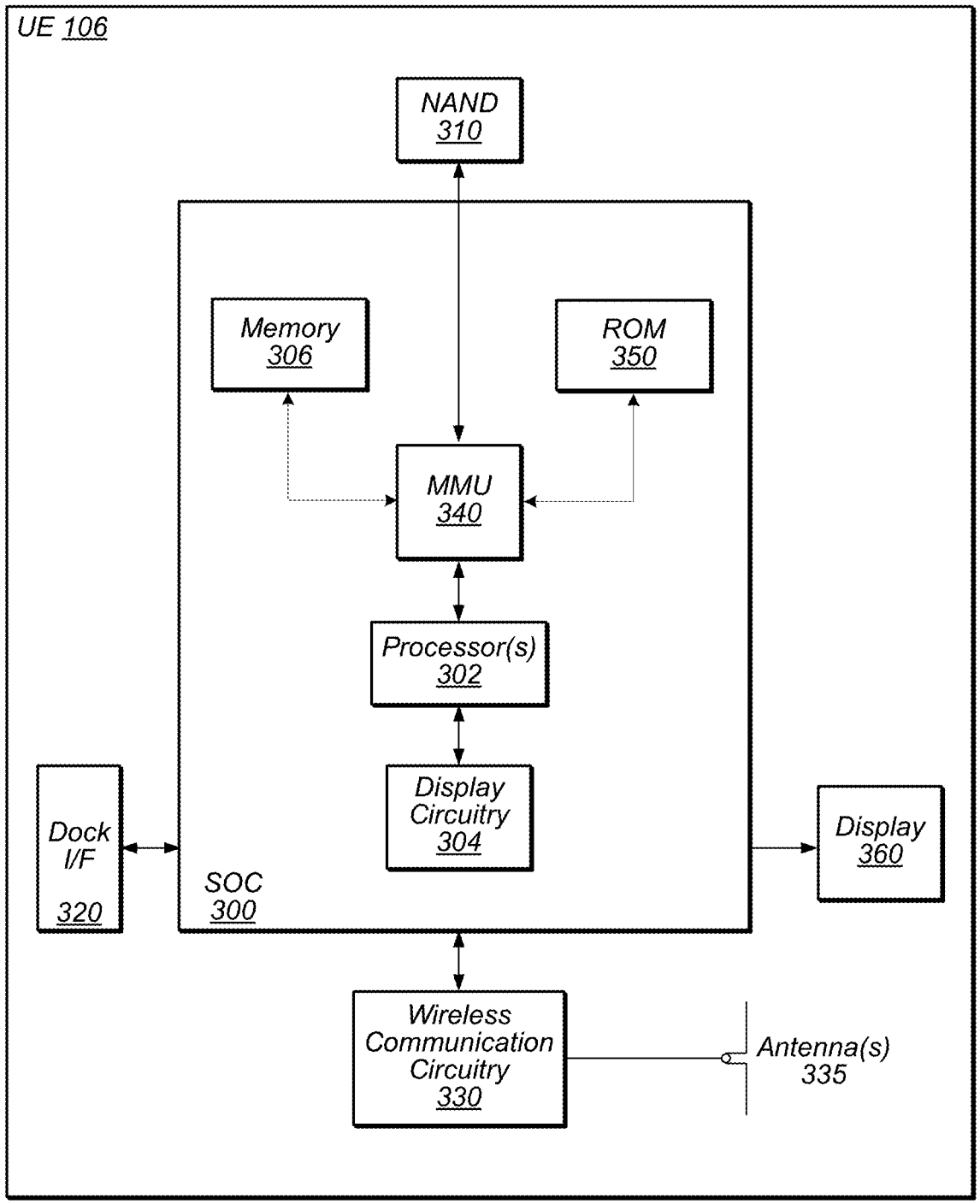
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor 302.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Additionally, as described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 6A-13B.

Figure 5:
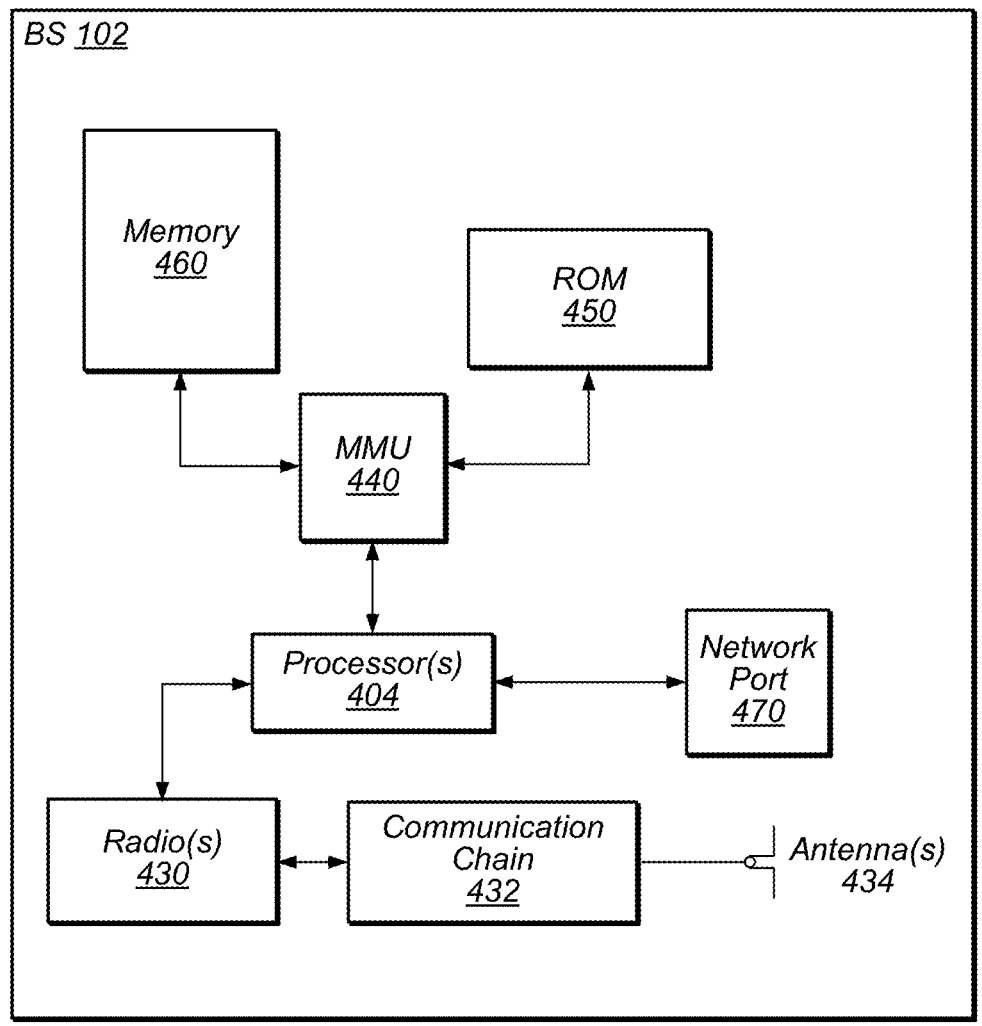
FIG. 5 illustrates an exemplary block diagram of a BS, according to some embodiments.

FIG. 5—Exemplary Block Diagram of a Base Station

FIG. 5 illustrates an exemplary block diagram of a base station 102, according to some embodiments. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Additionally, the base station 102 may include hardware and software components for implementing or supporting implementation of features described herein, such as those described herein with reference to, inter alia, FIGS. 6A-13B. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Cellular Coverage for Link Budget Limited Devices

There are many challenges associated with the hardware design of a wearable device, such as a smart watch, due to its size limitations. As a result, the capabilities of basic RF components such as the antenna may be limited compared to a traditional phone design. For example, the wearable device may be able to accommodate only one receive antenna (in contrast to a standard smart phone which typically has 2 receive antennas). In addition, the antenna in a wearable device may be considerably less efficient in comparison to a smart phone design (to the order of 10-15 dB) due to size constraints of the wearable device, and hence the reduced size of the antenna in the wearable device.

Figure 6A:
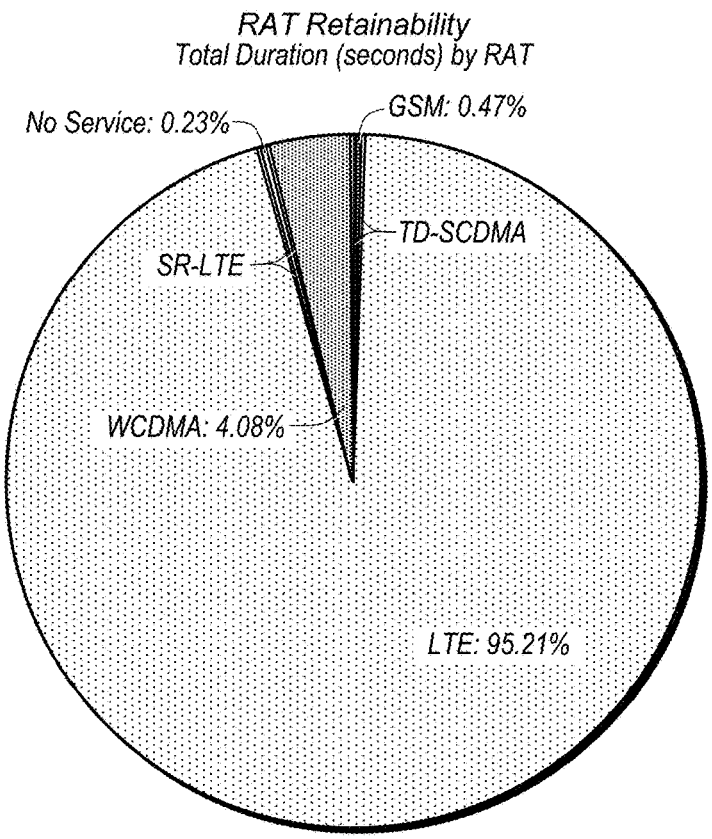
FIGS. 6A and 6B illustrate RAT retainability for a standard phone and a link budget limited UE.
Figure 6B:
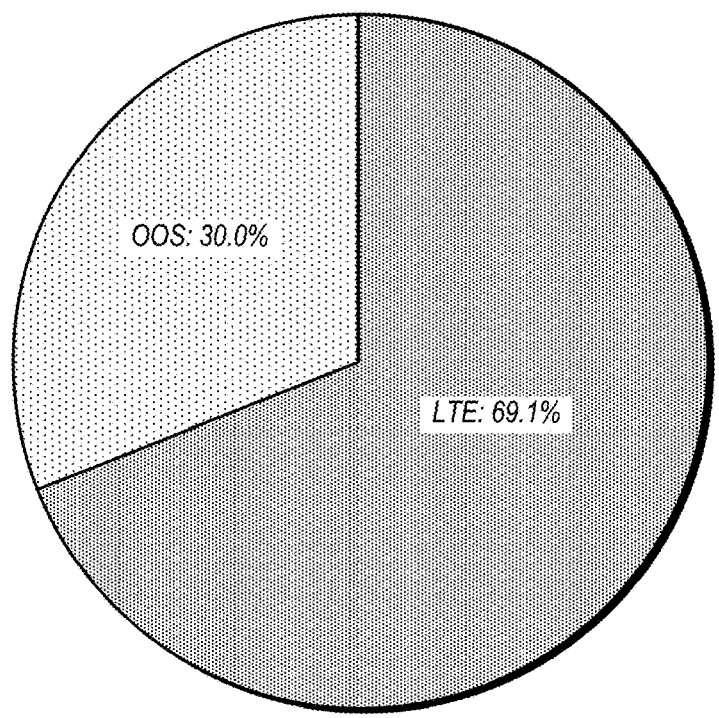

Cellular carriers have over the years generally optimized the cellular coverage in their markets relative to the Radio Frequency (RF) design of standard phones. The planned cellular coverage offered by most carriers is specifically tailored to the phone market, assuming typical maximum transmission power and/or receive sensitivity of standard smart phones. Thus a wearable device, which has inferior link budget performance in comparison to a standard phone by 10-15 dB, may see significant cellular coverage issues relative to a standard phone. Additionally, if a wearable device is designed to offer only packet switched wireless communication services, e.g., is an LTE only device, when LTE coverage is not available the device will not be able to fall back to a secondary technology such as a circuit-switched RAT. Thus a wearable device which is configured with only packet-switched communication capabilities has an additional disadvantage compared to phones which are multimode, e.g., which offer both packet-switched and circuit-switched capabilities, such as LTE, WCDMA and GSM. For example, FIGS. 6A-6B illustrates an example of a comparison of RAT retainability for a standard phone (FIG. 6A) and a LTE only device that is link budget limited (FIG. 6B). As can be seen from FIGS. 6A and 6B, for a given location, whereas a standard phone would retain LTE service approximately 95% of the time and experience a no service condition less than a quarter of a percent of the time, a link budget limited LTE only device would retain LTE service approximately 69% of the time and experience a no service condition for the remainder of the time (approximately 30%).

At least some embodiments described herein operate to provide a device (or a class of devices) with improved cellular communication coverage. The class of devices may be link budget limited devices, such as wearable devices. It is noted that the various operations described herein for link budget limited devices also applies to power limited UE devices, where the term "link budget limited" includes or encompasses power limited devices.

In at least some embodiments, the UE device is configured with the capability to choose a best cellular carrier/PLMN in at least some scenarios, such as in marginal coverage scenarios.

Figure 7A:
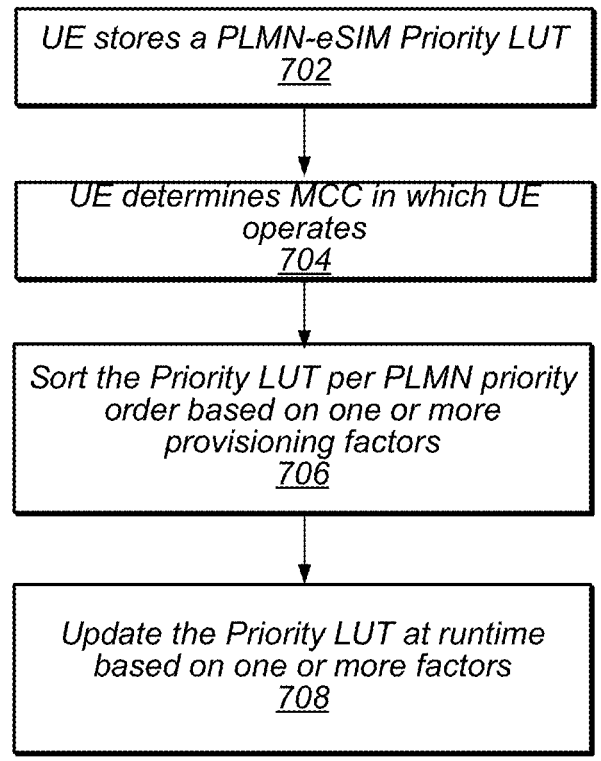
FIG. 7A is a flowchart diagram illustrating an example of a method for configuring a PLMN selection procedure in a UE, such as a link budget limited UE, according to some embodiments.
Figure 7B:
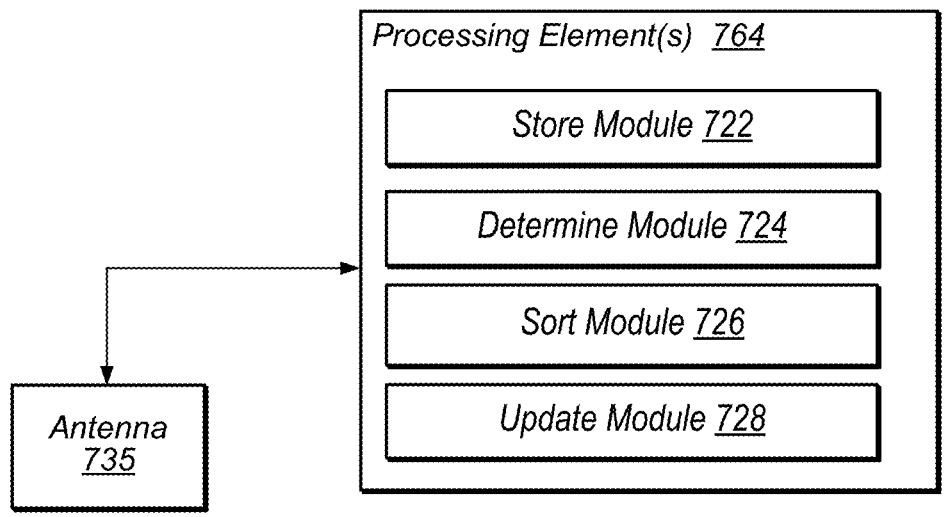
FIG. 7B illustrates an example of a processing element including modules for configuring a PLMN selection procedure in a UE, such as a link budget limited UE, according to some embodiments.

FIGS. 7A-B—Flowchart: Configuring the PLMN Selection Procedure

FIG. 7A is a flowchart diagram illustrating a method for configuring a PLMN selection procedure in a UE, such as a link budget limited UE (e.g., a wearable device), according to some embodiments. Additionally, according to some embodiments, the UE may only perform packet switched communications. While elements of the method of FIG. 7A are described substantially with reference to the LTE wireless communication technology, part or all of the method may be used in conjunction with other wireless communication technologies, as desired. The method shown in FIG. 7A may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 702, the UE stores a data structure which is useable for selecting an appropriate PLMN (and corresponding SIM device) for enabling the UE to communicate on a cellular network of the PLMN. For example, the UE may store a PLMN-eSIM priority look-up table (LUT) which maps respective Mobile Country Code/Mobile Network Code to a corresponding SIM device, e.g., to an allowed eUICC profile ID. Thus for a given available PLMN, the LUT determines or specifies one or more respective SIM profiles that can be used to register for service on that PLMN. It is noted that a mobile country code (MCC) is used in combination with a mobile network code (MNC) (also known as a "MCC/MNC tuple") to uniquely identify a mobile network operator (carrier) using certain public land mobile networks (PLMNs). These PLMNs include GSM (including GSM-R), UMTS, and LTE. Certain CDMA, iDEN, and satellite mobile networks may also be identified with an MCC/MNC tuple as well.

The data structure (the PLMN-eSIM priority LUT) may be provided to the UE device when the UE is first provisioned based on a subscription to a carrier network. Alternatively, or in addition, the data structure may be preconfigured on the UE device when the UE is initially manufactured. The data structure may be updated by a respective carrier network and/or by the UE vendor in a software update, e.g., via an over-the-air (OTA) update.

In 704 the UE may determine the current mobile country code (MCC) in which the UE is operating.

In 706 the UE may operate to sort the priority LUT per the PLMN order based on the MCC. Thus, within a given MCC, the UE may sort the table per a PLMN priority order, which may be based on the MCC/MNC. As a result, each MCC/MNC entry in the LUT specifies one or more allowed SIM profile IDs (one or more eUICC profile IDs). The LUT is thus configured such that for a given PLMN, the LUT specifies available SIM profiles that can be used to register for service. For example, where the MCC indicates the United States, the LUT may specify a preference for a first carrier over a second carrier (e.g., an AT&T network over a T-Mobile network). The LUT may also specify respective SIM preferences for different cellular carriers. For example, for the first carrier network, the LUT may specify a preference for an eSIM of the first carrier over a vendor (or manufacturer) or virtual SIM. For the second carrier, the LUT may specify a preference for a vendor (or manufacturer) or virtual SIM over a SIM of the second carrier. Thus the Priority LUT may provide varying degrees of flexibility in roaming cases.

In 708 the UE may operate to update the priority LUT at runtime based on one or more provisional factors. These one or more provisioning factors may comprise one or more of: user subscription preference, crowd sourced coverage map, steering policy based on business relationship between the UE manufacturer and the carrier, etc.

FIG. 7B illustrates an example of a processing element including modules for configuring a PLMN selection procedure in a UE, such as UE 106, according to some embodiments. In some embodiments, antenna 735 may be coupled (directly or indirectly) to processing element 764. The processing element may be configured to perform the method described above in reference to FIG. 7A. In some embodiments, processing element 735 may include one or more modules, such as modules (or circuitry) 722-728, and the modules (or circuitry) may be configured to perform various operations of the method described above in reference to FIG. 7A. In some embodiments, the processing element may be included in a UE, such as UE 106. As shown, the modules may be configured as follows.

In some embodiments, processing element 764 may include a store module 722 configured to store a data structure which is useable for selecting an appropriate PLMN (and corresponding SIM device) for enabling a UE, such as UE 106, to communicate on a cellular network of the PLMN. For example, store module 722 may store a PLMN-eSIM priority look-up table (LUT) which maps respective Mobile Country Code/Mobile Network Code to a corresponding SIM device, e.g., to an allowed eUICC profile ID. Thus for a given available PLMN, the LUT determines or specifies one or more respective SIM profiles that can be used to register for service on that PLMN.

In some embodiments, processing element 764 may include a determine module 724 configured to determine the current mobile country code (MCC) in which the UE is operating.

In some embodiments, processing element 764 may include a sort module 726 configured to sort the priority LUT per the PLMN order based on the MCC. Thus, within a given MCC, sort module 726 may sort the table per a PLMN priority order, which may be based on the MCC/MNC. As a result, each MCC/MNC entry in the LUT specifies one or more allowed SIM profile IDs (one or more eUICC profile IDs). The LUT is thus configured such that for a given PLMN, the LUT specifies available SIM profiles that can be used to register for service. For example, where the MCC indicates the United States, the LUT may specify a preference for a first carrier over a second carrier (e.g., an AT&T network over a T-Mobile network). The LUT may also specify respective SIM preferences for different cellular carriers. For example, for the first carrier network, the LUT may specify a preference for an eSIM of the first carrier over a vendor (or manufacturer) or virtual SIM. For the second carrier, the LUT may specify a preference for a vendor (or manufacturer) or virtual SIM over a SIM of the second carrier. Thus the Priority LUT may provide varying degrees of flexibility in roaming cases.

In some embodiments, processing element 764 may include an update module 728 configured to update the priority LUT at runtime based on one or more provisional factors. These one or more provisioning factors may comprise one or more of: user subscription preference, crowd sourced coverage map, steering policy based on business relationship between the UE manufacturer and the carrier, etc.

It is apparent for those skilled in the art that, for the particular processes of the modules (or circuitry) described above (such as modules 722, 724, 726, and 728), reference may be made to the corresponding operations (such as operations 702, 704, 706, and 708, respectively) in the related process embodiment sharing the same concept and the reference is regarded as the disclosure of the related modules (or circuitry) as well. Furthermore, processing element 764 may be implemented in software, hardware or combination thereof. More specifically, processing element 764 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 764 may be implemented as a general-purpose processor such as a CPU, and therefore each module can be implemented with the CPU executing instructions stored in a memory which perform a respective operation.

Figure 8A:
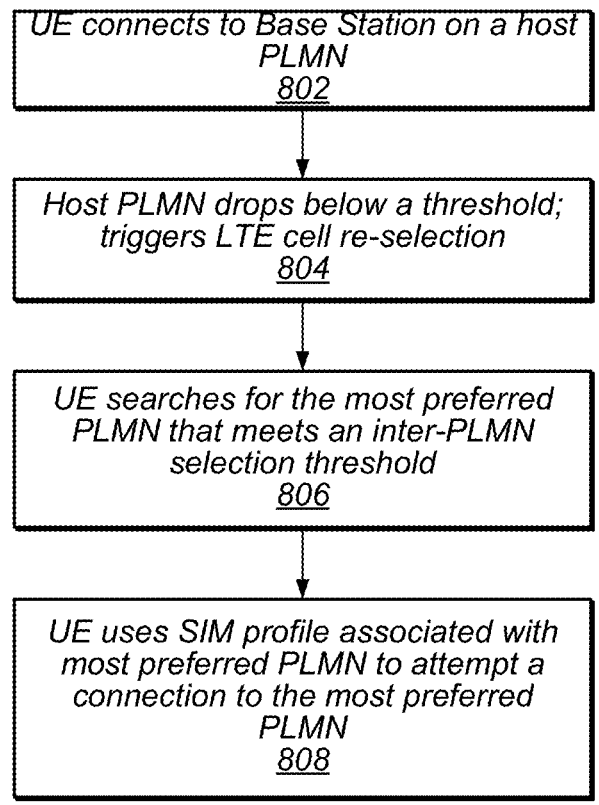
FIG. 8A is a flowchart diagram illustrating an example of a method for a UE to dynamically select a PLMN (or cellular carrier) for communication in a cellular network, according to some embodiments.
Figure 8B:
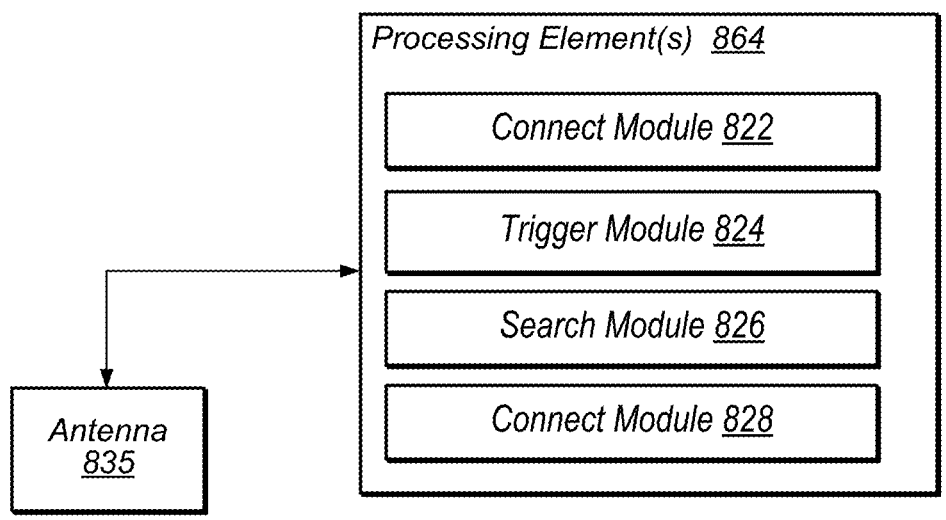
FIG. 8B illustrates an example of a processing element including modules for dynamically selecting a PLMN (or cellular carrier) for communication in a cellular network, according to some embodiments.

FIG. 8A-B—Flowchart: PLMN Selection

FIG. 8A is a flowchart diagram illustrating an example of a method for a UE to dynamically select a PLMN (or cellular carrier) for communication in a cellular network, according to some embodiments. The UE may be a link budget limited UE (e.g., a wearable device). Additionally, according to some embodiments, the UE may only perform packet switched communications. Note that while elements of the method of FIG. 8A are described substantially with reference to the LTE wireless communication technology, part or all of the method may be used in conjunction with other wireless communication technologies, as desired.

The method shown in FIG. 8A may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 802, the UE 106 connects with a base station (for example, base station 102A) of a cellular network to establish a connection with that base station for coverage in the cellular network. This base station is associated with a first carrier, or is associated with a first PLMN, referred to as the host PLMN.

In 804, the host PLMN may drop below a threshold for communication. For example, a signal strength, or RSRP (Reference Signal Received Power) of the host PLMN may drop below a threshold. As another example, the UE may lose service (e.g., at out of service condition may occur) with the host PLMN. When either condition occurs, it may trigger the UE to perform cell re-selection. In other words, a condition such as dropping below a signal strength threshold or losing service may trigger the UE to begin searching for a new cell. In some embodiments, the search may also be triggered if the signal strength is within a percentage of the threshold. In other words, a search for a new cell may be initiated if the UE detects that the signal strength is approaching the threshold. Note, however, that unlike HP-PLMN (high priority PLMN) searches which occur periodically (e.g., every 6 minutes) as background scans, some UEs may need to minimize background PLMN search activities. Thus, the host PLMN may be maintained and searches limited (or cancelled) so long as the host PLMN provides sufficient coverage above the threshold (e.g., is more than a specified percentage above the threshold).

In 806, the UE may search for a most preferred PLMN on which the UE can connect. Thus the UE may search for the PLMN that currently provides the best communication scenario for the UE. For example, the UE may search for a most preferred PLMN that meets an inter-PLMN re-selection threshold. The inter-PLMN re-selection threshold may be based on a minimum signal strength, or RSRP. The minimum signal strength may aid in the UE avoiding frequent PLMN switching. In other words, the inter-PLMN re-selection threshold may be set at a signal strength level that is sufficiently above the signal strength necessary for communication (and in turn, the threshold for trigger the cell reselection).

To assist the searching of other PLMN LTE cells, location assistance data may be used to provide a list of E-UTRA Absolute Radio Frequency Channels (EARFCNs) that are expected for each PLMN within a pre-determined geographic location tile, or based on UE mobility, a targeted geographic location tile to which the UE is travelling. The location assistance data may be provided from a neighboring WiFi access point (AP) or a companion phone to the UE. Alternatively, the location assistance data may be crowd-sourced from various other sources.

In some embodiments, the UE may track location and associate signal strength, or RSRP, of searched PLMNs with the tracked location. The UE may store the associated signal strength of searched PLMNs, along with the tracked location, in a data structure that may be sent to a server. The data structure may be sent to the server via a companion phone from the UE, via a neighboring WiFi AP, and/or over-the-air (e.g., via a cellular data connection).

In some embodiments, the most preferred PLMN search may be performed based at least in part on a data structure, such as the data structure described above in reference to FIG. 7A. The data structure, in some embodiments, may be sorted within an MCC based at least in part on provisioning factors such as user subscription preferences, crowd-sourced coverage maps, and/or steering policies based on business relationships, among other provisioning factors. In some embodiments, the provisioning factors may also include user subscriptions (e.g., carriers for which the UE has an associated subscription) and the data structure may only include PLMNs for which the UE is associated with an active user subscription. Note that each entry in the data structure may reference a particular PLMN (i.e., a MCC/MNC tuple) and may further be associated with a list (data structure) of allowed eUICC profile IDs. Thus, for a given available PLMN, the UE may determine which SIM profiles may be used to register for service.

In 808, the UE may use the most preferred PLMN identified in 806 and the priority LUT to identify an appropriate SIM profile to sue to attempt to connect to the identified PLMN. If connection attempt is successful, the UE may camp on the identified PLMN. If the connection attempt is not successful, the UE may attempt to connect to another PLMN based at least in part of the data structure.

Figure 9:
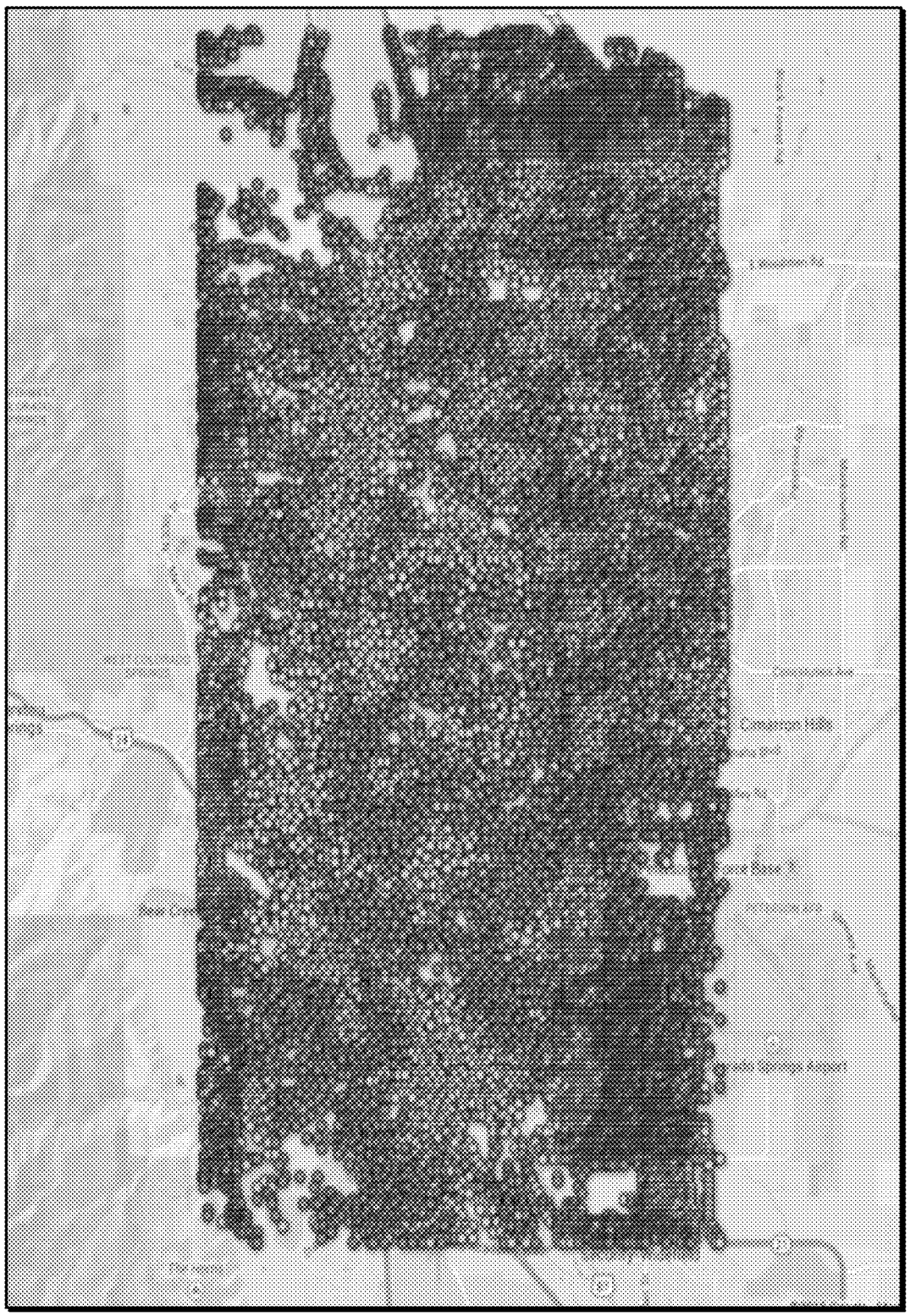
FIG. 9 illustrates an example of a coverage map of a US mobile carrier that illustrates where a link budget limited device may have service, according to the prior art.
Figure 10:
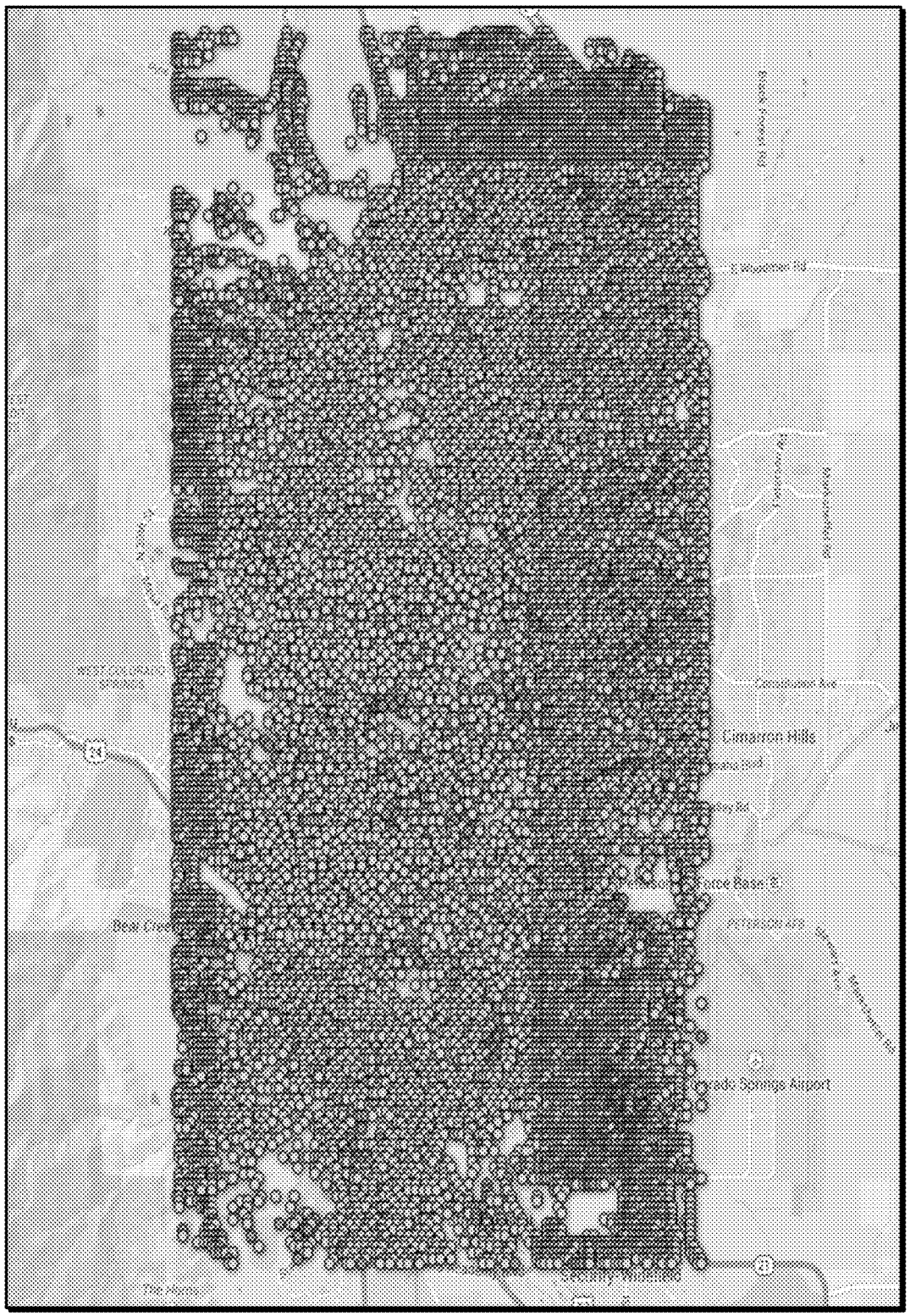
FIG. 10 illustrates an example of a coverage map of a US mobile carrier that illustrates where a link budget limited device may have service, according to some embodiments.

As one example, FIGS. 9 and 10 illustrate two coverage maps of a US mobile carrier in Colorado Springs, Colo. FIG. 9 illustrates coverage of the US mobile carrier as of April 2015 where darker points indicate that link budget limited UEs such as wearable devices would be out of coverage (i.e., LTE RSRP<−105 dBm) and lighter points indicate that link budget limited UEs would not be out of coverage (i.e., LTE RSRP>−105 dBm). FIG. 10 on the other hand, illustrates the coverage for a link budget limited UE such as a wearable device configured as described herein, wherein when the device detects that its serving carrier signal strength is low (in this example the threshold is −105 dBm RSRP), the device is able to switch to a better carrier/PLMN. As with FIG. 9, lighter points indicate areas of service whereas darker points indicate areas of no service.

This data is based on location and signal strength data collected from currently deployed mobile phones. In other words, the data shown in FIGS. 9 and 10 was collected from various sources and is thus, crowd-sourced data. The assumption is that, with a typical link budget of phone designs, LTE cells can be decoded until −120 dBm RSRP. A 15 dB efficiency compromise for wearable devices may be assumed, resulting in a threshold for −105 dBm RSRP for the location data. For the considered communication environment, using embodiments described herein, in one scenario the wearable device coverage improved 53.67%, in comparison to a legacy implementation where the wearable device only operates in a given carrier. The benefit of the embodiments described herein may depend on the respective cellular carrier. For example, with one U.S. carrier, the coverage enhancement benefit is ~20% whereas for another U.S. carrier, the coverage enhancement benefit is ~60%. The data points illustrated represent a suburban communication environment. Similar performance improvements may be achieved in all use cases (urban, suburban and rural coverage) if a different carrier is dynamically selected as described herein. The reason of performance gain by switching to other operators is that cell sites of various carriers are not always co-located and the closest base station to a device may not be from the current carrier.

FIG. 8B illustrates an example of a processing element including modules for dynamically selecting a PLMN (or cellular carrier) for communication in a cellular network, according to some embodiments. In some embodiments, antenna 835 may be coupled (directly or indirectly) to processing element 864. The processing element may be configured to perform the method described above in reference to FIG. 8A. In some embodiments, processing element 864 may include one or more modules, such as modules (or circuitry) 822-828, and the modules (or circuitry) may be configured to perform various operations of the method described above in reference to FIG. 8A. In some embodiments, the processing element may be included in a UE, such as UE 106. As shown, the modules may be configured as follows.

In some embodiments, processing element 864 may include a connect module 822 configured to connect (or generate instructions to connect) with a base station (for example, base station 102A) of a cellular network to establish a connection with that base station for coverage in the cellular network. This base station is associated with a first carrier, or is associated with a first PLMN, referred to as the host PLMN.

In some embodiments, processing element 864 may include a trigger module 824 configured to trigger performance of cell re-selection in response to the host PLMN dropping below a threshold for communication. For example, a signal strength, or RSRP (Reference Signal Received Power) of the host PLMN may drop below a threshold. As another example, the UE may lose service (e.g., at out of service condition may occur) with the host PLMN. When either condition occurs, it may trigger performance of cell re-selection. In other words, a condition such as dropping below a signal strength threshold or losing service may trigger a search for a new cell. In some embodiments, the search may also be triggered if the signal strength is within a percentage of the threshold. In other words, a search for a new cell may be initiated if the UE detects that the signal strength is approaching the threshold. Note, however, that unlike HP-PLMN (high priority PLMN) searches which occur periodically (e.g., every 6 minutes) as background scans, some UEs may need to minimize background PLMN search activities. Thus, the host PLMN may be maintained and searches limited (or cancelled) so long as the host PLMN provides sufficient coverage above the threshold (e.g., is more than a specified percentage above the threshold).

In some embodiments, processing element 864 may include a search module 826 configured to search (or generate instructions to search) for a most preferred PLMN on which the UE can connect. Thus search module 826 may search for the PLMN that currently provides the best communication scenario for the UE. For example, search module 826 may search for a most preferred PLMN that meets an inter-PLMN re-selection threshold. The inter-PLMN re-selection threshold may be based on a minimum signal strength, or RSRP. The minimum signal strength may aid in the UE avoiding frequent PLMN switching. In other words, the inter-PLMN re-selection threshold may be set at a signal strength level that is sufficiently above the signal strength necessary for communication (and in turn, the threshold for trigger the cell reselection).

To assist the searching of other PLMN LTE cells, location assistance data may be used to provide a list of E-UTRA Absolute Radio Frequency Channels (EARFCNs) that are expected for each PLMN within a pre-determined geographic location tile, or based on UE mobility, a targeted geographic location tile to which the UE is travelling. The location assistance data may be provided from a neighboring WiFi access point (AP) or a companion phone to the UE. Alternatively, the location assistance data may be crowd-sourced from various other sources.

In some embodiments, location of the UE may be tracked and signal strength, or RSRP, of searched PLMNs may be associated with the tracked location. The associated signal strength of searched PLMNs, along with the tracked location, may be stored in a data structure that may be sent to a server. The data structure may be sent to the server via a companion phone from the UE, via a neighboring WiFi AP, and/or over-the-air (e.g., via a cellular data connection).

In some embodiments, the most preferred PLMN search may be performed based at least in part on a data structure, such as the data structure described above in reference to FIG. 7A. The data structure, in some embodiments, may be sorted within an MCC based at least in part on provisioning factors such as user subscription preferences, crowd-sourced coverage maps, and/or steering policies based on business relationships, among other provisioning factors. In some embodiments, the provisioning factors may also include user subscriptions (e.g., carriers for which the UE has an associated subscription) and the data structure may only include PLMNs for which the UE is associated with an active user subscription. Note that each entry in the data structure may reference a particular PLMN (i.e., a MCC/MNC tuple) and may further be associated with a list (data structure) of allowed eUICC profile IDs. Thus, for a given available PLMN, the UE may determine which SIM profiles may be used to register for service.

In some embodiments, processing element 864 may include a connect module 828 configured to attempt to connect (or generate instructions to attempt to connect) to the identified PLMN using the most preferred PLMN identified by search module 826 and the priority LUT to identify an appropriate SIM profile to use to attempt the connection. If connection attempt is successful, the UE may camp on the identified PLMN. If the connection attempt is not successful, the UE may attempt to connect to another PLMN based at least in part on the data structure.

It is apparent for those skilled in the art that, for the particular processes of the modules (or circuitry) described above (such as modules 822, 824, 826, and 828), reference may be made to the corresponding operations (such as operations 802, 804, 806, and 808, respectively) in the related process embodiment sharing the same concept and the reference is regarded as the disclosure of the related modules (or circuitry) as well. Furthermore, processing element 864 may be implemented in software, hardware or combination thereof. More specifically, processing element 864 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 864 may be implemented as a general-purpose processor such as a CPU, and therefore each module can be implemented with the CPU executing instructions stored in a memory which perform a respective operation.

Figure 11:
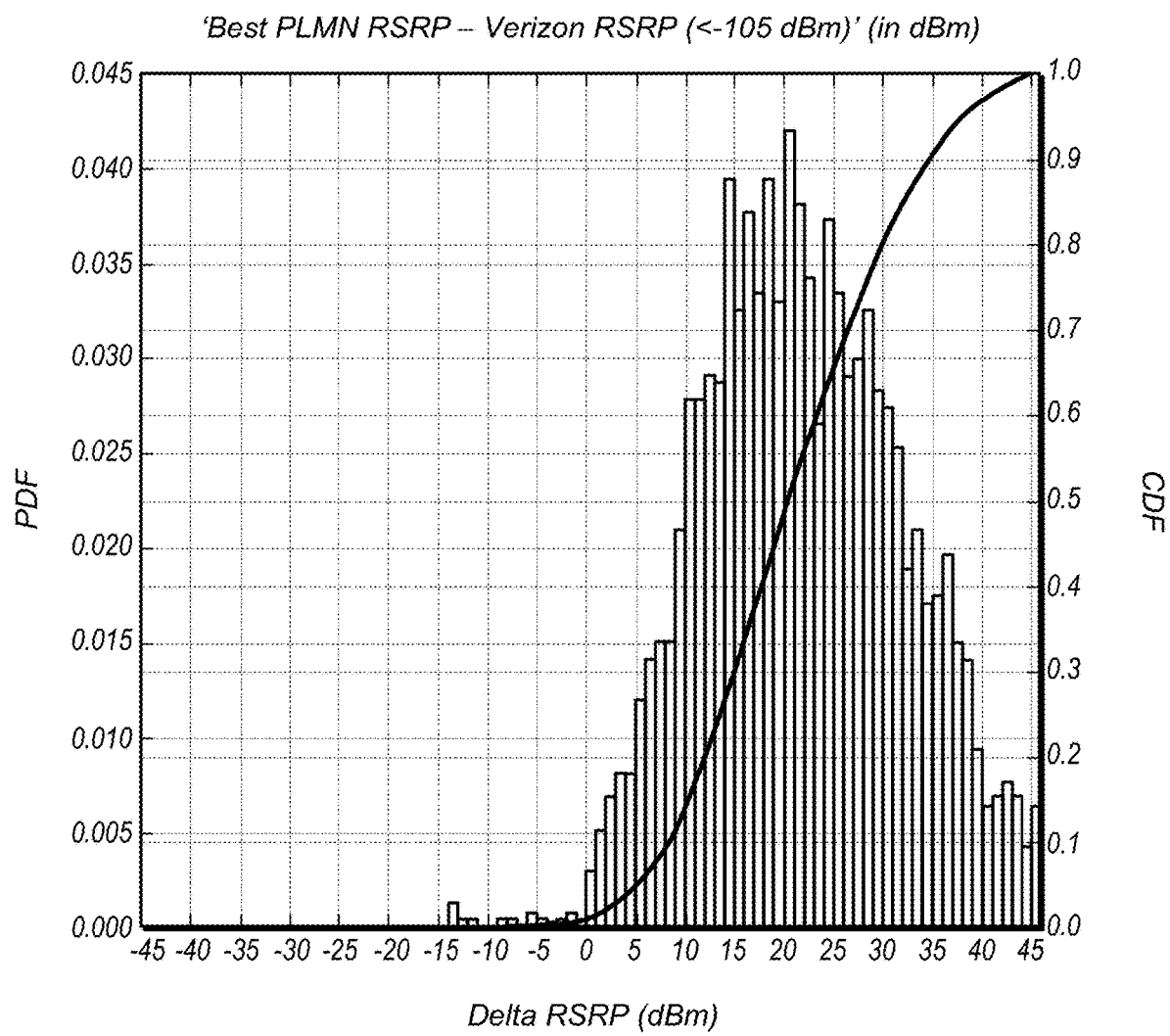
FIG. 11 illustrates example benefits of dynamic carrier selection according to some embodiments.

FIG. 11—Benefit of Dynamic Carrier Switching in Urban Environment

FIG. 11 illustrates the benefit of dynamic carrier selection from a different point of view, according to some embodiments. In this example Manhattan is chosen as an urban communication environment and the possible gain of a particular carrier subscriber is illustrated. FIG. 11 shows the potential delta gain of a device when it uses dynamic carrier selection in comparison to sticking to the particular carrier's network the whole time. As it can be seen from Probability Density Function (PDF), which can also be considered as a histogram, the UE may gain on average 21 dBm by utilizing the proposed algorithm.

In some embodiments, the threshold to choose a different carrier may be chosen to avoid a ping pong (i.e., the threshold may include some specified amount of hysteresis) between operators. Additionally, avoiding such switching back and forth between carriers will reduce impact on system power (i.e., will aid in preserving battery power).

According to some embodiments, based on data from 3 different markets (e.g., urban [Manhattan], suburban [Colorado Springs], and rural [Ohio]) a gain of up to 22 dBm may be achieved for most markets as well as wearable coverage increase up to 60%. Embodiments described herein may significantly improve the link coverage for link budget limited UEs such as wearable devices and may ensure these devices are generally connected to a best available network. Note that the benefit of the algorithm may depend on the characteristics of the communication environment (e.g., whether it is densely populated). Thus, in some embodiments, characteristics of the current communication environment (e.g., urban, rural, suburban, and so forth) may be considered when scanning for carriers.

Figure 12A:
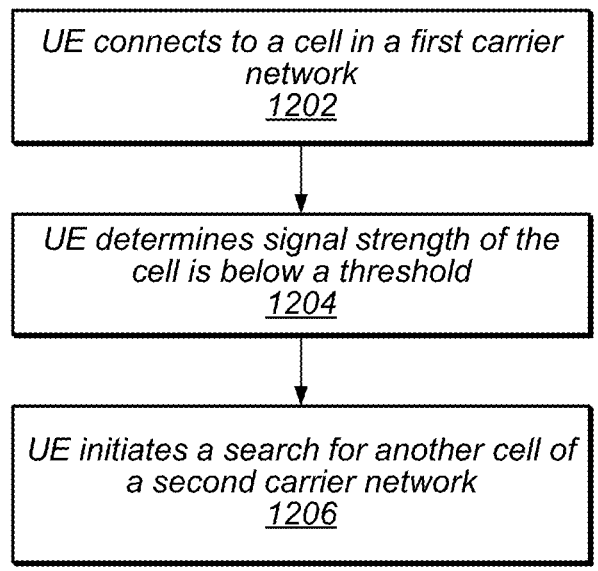
FIG. 12A is a flowchart diagram illustrating an example of a method for a UE to dynamically select a new cell for communication in a cellular network, according to embodiments.
Figure 12B:
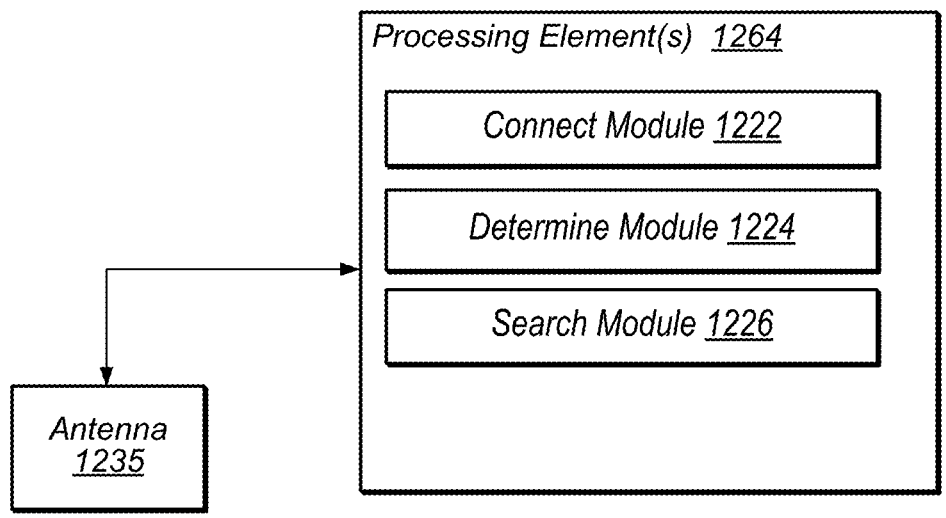
FIG. 12B illustrates an example of a processing element including modules for dynamically selecting a new cell for communication in a cellular network, according to embodiments.

FIGS. 12A-B—Flowchart: Carrier Switching

FIG. 12A is a flowchart diagram illustrating an example of a method for a UE to dynamically select a new cell for communication in a cellular network, according to some embodiments. The new cell may be with a carrier different than the carrier of a current cell on which the UE is camped. The UE may be a link budget limited UE (e.g., a wearable device). Additionally, according to some embodiments, the UE may only perform packet switched communications.

Thus, unlike in some prior art schemes or systems, where a UE is generally associated with a single carrier subscription (e.g., a single SIM profile identity) that may include roaming agreements that allow the UE to use services of additional carriers, embodiments described herein may allow a UE to use services from a plurality of carriers (e.g., via a plurality of SIM profile identities) with or without the inclusion of a roaming agreement. Hence, each carrier may be associated with a subscription (e.g., a SIM profile identity) that may allow the UE to use services provide by the carrier. Alternatively, or in addition, the UE may be associated with a master (or virtual) subscription that may allow the UE to use services from a plurality of carriers (e.g., without roaming agreements). In such schemes, a third party, such as a UE manufacturer, may have agreements with the plurality of carriers that allows the UE to be associated with multiple subscriptions (e.g., maintain multiple SIM profile identities) that allows the UE to use services provided by each carrier of the plurality of carriers.

The method shown in FIG. 12A may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 1202, the UE may connect to a cell in a first carrier network. In other words, the UE may connect to a base station of the cell and the cell may be included in a cellular network associated with (or owned and/or operated) by a first cellular carrier (carrier). The UE may be an LTE only device. In other words, the UE may only use packet switched communication. The UE may be associated with a subscription for the first carrier. Thus, the UE may have a SIM profile associated with the first carrier that allows the UE to use services provided by the first carrier. Additionally, the UE may be associated with a subscription for at least one additional carrier. In other words, the UE may include SIM profiles associated with a plurality of carriers, each SIM profile allowing the UE to use services provided by a carrier associated with the SIM profile.

In 1204, the UE may determine signal strength of a received signal from the cell is below a threshold. Thus, the UE may monitor or track the signal strength from the cell and may dynamically compare the signal strength to a threshold.

In 1206, the UE may initiate a search for a new cell. The new cell may be in another cellular network associated with at least one additional carrier. In some embodiments, the may search be based at least in part on a location of the UE and signal strength data associated with the location of the UE. The signal strength data may be stored in a data structure on the UE or may be retrieved from a data structure stored on a companion UE communicatively coupled to the UE. In other words, the UE may store geographic signal strength data locally in a data structure or may leverage a local connection (e.g., a Bluetooth or WiFi connection) with a companion UE that may store geographic signal strength data for the UE.

In some embodiments, the search may be based at least in part on a location of the UE and crowd-sourced signal strength data associated with the location of the UE. The crowd-sourced signal strength data may be retrieved from a server via an over the air connection (e.g., a cellular, WiFi, or Bluetooth connection) or may be passed to the UE via a companion UE that retrieves the crowd-sourced signal strength data from the server. In some embodiments, the crowd-sourced signal strength data may be comprised in a data structure and the data structure may be updated at the server. Thus, the UE may receive an updated data structure from the server, either via a cellular connection or via a local connection. In some embodiments, the UE may receive crowd-sourced location data from one or more neighboring UEs via a local connection (e.g., a local WiFi connection, a Bluetooth connection, and/or a multicast or unicast message from any of the one or more neighboring UEs).

In some embodiments, the UE may track signal strength for one or more cells at or within a specified range of a geographic location of the UE. In other words, the UE may monitor and log (save) received signal strengths from base stations within its reception range. The UE may also associate the signal strength for each of the one or more cells to the geographic location and transmit the associated signal strengths for each of the one or more cells to a server. Thus, the UE may send data to a server for updating data that may be used for crowd-sourcing.

In some embodiments, in order to connect to the cell, the UE may select a first profile identity (e.g., an eUICC profile ID) for connection with the carrier and the first profile identity may be associated with the carrier. In addition, in order to connect to the new cell, the UE may select a second profile identity for connection with the new cell and the second profile identity may be associated with the new carrier. In some embodiments, the UE may determine that a received signal strength from the new cell is below a second threshold prior to selecting the new cell and, in response, may initiate a search for another new cell which may be in any carrier network for which the UE has a subscription.

FIG. 12B illustrates an example of a processing element including modules for dynamically selecting a new cell for communication in a cellular network, according to some embodiments. In some embodiments, antenna 1235 may be coupled (directly or indirectly) to processing element 1264. The processing element may be configured to perform the method described above in reference to FIG. 12A. In some embodiments, processing element 1235 may include one or more modules, such as modules (or circuitry) 1222-1226, and the modules (or circuitry) may be configured to perform various operations of the method described above in reference to FIG. 12A. In some embodiments, the processing element may be included in a UE, such as UE 106. As shown, the modules may be configured as follows.

In some embodiments, processing element 1264 may include a connect module 1222 configured to connect (or generate generation instructions to connect) a UE to a cell in a first carrier network. In other words, the UE may connect to a base station of the cell and the cell may be included in a cellular network associated with (or owned and/or operated) by a first cellular carrier (carrier). The UE may be an LTE only device. In other words, the UE may only use packet switched communication. The UE may be associated with a subscription for the first carrier. Thus, the UE may have a SIM profile associated with the first carrier that allows the UE to use services provided by the first carrier. Additionally, the UE may be associated with a subscription for at least one additional carrier. In other words, the UE may include SIM profiles associated with a plurality of carriers, each SIM profile allowing the UE to use services provided by a carrier associated with the SIM profile.

In some embodiments, processing element 1264 may include a determine module 1224 configured to determine signal strength of a received signal from the cell is below a threshold. Thus, the UE may monitor or track the signal strength from the cell and may dynamically compare the signal strength to a threshold.

In some embodiments, processing element 1264 may include a search module 1226 configured to initiate a search for a new cell. The new cell may be in another cellular network associated with at least one additional carrier. In some embodiments, the search may be based at least in part on a location of the UE and signal strength data associated with the location of the UE. The signal strength data may be stored in a data structure on the UE or may be retrieved from a data structure stored on a companion UE communicatively coupled to the UE. In other words, the UE may store geographic signal strength data locally in a data structure or may leverage a local connection (e.g., a Bluetooth or WiFi connection) with a companion UE that may store geographic signal strength data for the UE.

In some embodiments, the search may be based at least in part on a location of the UE and crowd-sourced signal strength data associated with the location of the UE. The crowd-sourced signal strength data may be retrieved from a server via an over the air connection (e.g., a cellular, WiFi, or Bluetooth connection) or may be passed to the UE via a companion UE that retrieves the crowd-sourced signal strength data from the server. In some embodiments, the crowd-sourced signal strength data may be comprised in a data structure and the data structure may be updated at the server. Thus, processing element 1264 may include a receive module configured to receive an updated data structure from the server, either via a cellular connection or via a local connection. In some embodiments, the receive module may be configured to receive crowd-sourced location data from one or more neighboring UEs via a local connection (e.g., a local WiFi connection, a Bluetooth connection, and/or a multicast or unicast message from any of the one or more neighboring UEs).

In some embodiments, processing element 1264 may include a tracking module configured to track signal strength for one or more cells at or within a specified range of a geographic location of the UE. In other words, the tracking module may monitor and log (save) received signal strengths from base stations within its reception range. The tracking module may also be configured to associate the signal strength for each of the one or more cells to the geographic location and transmit the associated signal strengths for each of the one or more cells to a server. Thus, the tracking module may be configured to may send data to a server for updating data that may be used for crowd-sourcing.

In some embodiments, in order to connect to the cell, a first profile identity (e.g., an eUICC profile ID) for connection with the carrier may be selected and the first profile identity may be associated with the carrier. In addition, in order to connect to the new cell, a second profile identity may be selected for connection with the new cell and the second profile identity may be associated with the new carrier. In some embodiments, a received signal strength from the new cell may be determined to be below a second threshold prior to selecting the new cell and, in response, a search for another new cell which may be in any carrier network for which the UE has a subscription may be initiated.

It is apparent for those skilled in the art that, for the particular processes of the modules (or circuitry) described above (such as modules 1222, 1224, and 1226), reference may be made to the corresponding operations (such as operations 1202, 1204, and 1206, respectively) in the related process embodiment sharing the same concept and the reference is regarded as the disclosure of the related modules (or circuitry) as well. Furthermore, processing element 1264 may be implemented in software, hardware or combination thereof. More specifically, processing element 1264 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1264 may be implemented as a general-purpose processor such as a CPU, and therefore each module can be implemented with the CPU executing instructions stored in a memory which perform a respective operation.

Figure 13A:
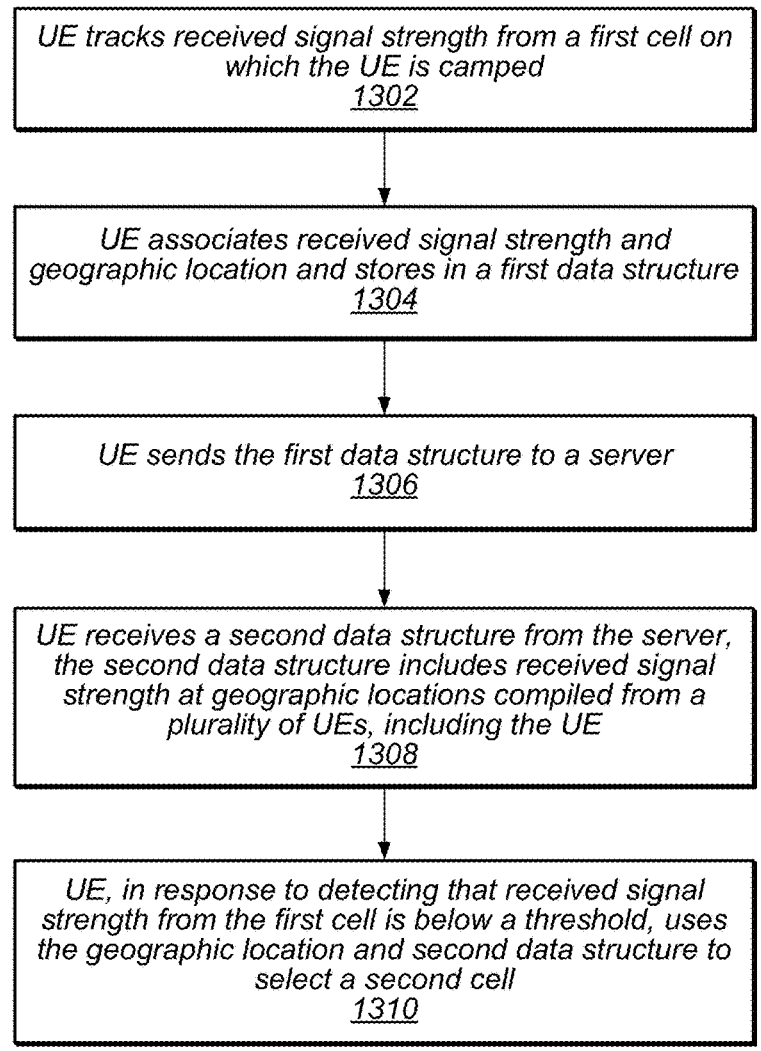
FIG. 13A is a flowchart diagram illustrating an example of a method for a UE to dynamically select a new cell for communication in a cellular network based on crowd-sourced information, according to some embodiments.
Figure 13B:
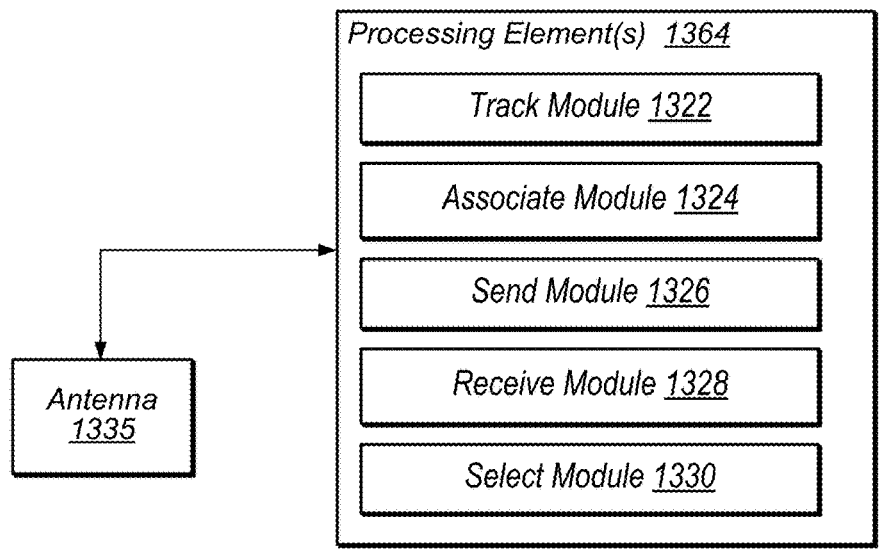
FIG. 13B illustrates an example of a processing element including modules for dynamically selecting a new cell for communication in a cellular network based on crowd-sourced information, according to some embodiments.

FIGS. 13A-B—Flowchart: Crowd-Sourced Cell Selection

FIG. 13A is a flowchart diagram illustrating an example of a method for a UE to dynamically select a new cell for communication in a cellular network based on crowd-sourced information, according to some embodiments. The new cell may be with a carrier different than the carrier of a current cell on which the UE is camped. The UE may be a link budget limited UE (e.g., a wearable device). Additionally, according to some embodiments, the UE may only perform packet switched communications.

The method shown in FIG. 13A may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 1302, the UE may track received signal strength from a first cell currently connected to the UE. In other words, the UE may monitor and/or log received signal strength from the first cell (or a base station in the first cell) on which the UE is currently camped. The first cell may be operated (or owned and operated) be a first carrier. The UE may be associated with a subscription that allows (or enables) the UE to use services of the first carrier and may additionally store a SIM profile identity (e.g., an eUICC profile ID) associated with the first carrier. In some embodiments, the UE may use a first profile identity when communicating with the first carrier, wherein the first profile identity is associated with the first subscription.

In 1304, the UE may associate the received signal strength with a geographic location of the UE. Thus, the UE may link the received signal strength from the first cell to a geographic location. The UE may store the received signal strength and geographic location in a first data structure. The first data structure may be stored on the UE. Alternatively, or in addition, the first data structure may be stored on a companion UE that is connected to the UE via a local connection (such as WiFi, Bluetooth, or Bluetooth low energy, and so forth).

In 1306, the UE may send the first data structure to a server. The first data structure may be sent periodically (e.g., at predetermined intervals), when requested by the server, and/or based on occurrence of various conditions, such as establishment of a local connection to a wireless access point or a companion UE, the first data structure reaching a size threshold, and so forth. The UE may send the first data structure via a cellular connection, a WiFi connection, or may send the first data structure via the companion UE. In other words, the UE may store the first data structure and may send it to the companion UE via a local connection and the companion UE may forward the first data structure to the server via a cellular or WiFi connection.

In 1308, the UE may receive a second data structure from the server. The second data structure may be received periodically (e.g., at predetermined intervals), when requested by the UE, and/or based on occurrence of various conditions, such as establishment of a local connection to a wireless access point or a companion UE, the first data structure reaching a size threshold, and so forth. The second data structure may be received over a cellular or WiFi connection. In some embodiments, the companion UE may receive the second data structure and send it to the UE via a local connection. The second data structure may include information based on received signal strength at geographic locations compiled from a plurality of UEs, including the UE. In other words, the second data structure may include crowd-sourced data compiled from a plurality of UEs sending first data structures to the server.

In some embodiments, the information may include a prioritized list of public land mobile networks (PLMNs) (e.g., a prioritized LUT as described herein). In some embodiments, the PLMNs may be prioritized based on signal strength at a geographic location. The prioritized list of PLMNs may include PLMNs from carriers for which the UE has an associated subscription.

In some embodiments, the information may include a plurality of prioritized lists of PLMNs and each prioritized list may include PLMNs associated with one of a particular geographic location, a particular geographic zone, or a particular geographic region. In other words, each PLMN list (or prioritized LUT as described herein), may be associated with a particular region. The region may be a location (e.g., a particular location with a specified distance of the UE), a zone (e.g. a city, a county, or a state), or a region (e.g., a plurality of cities, a metropolitan area, one or more states, and so forth). In some embodiments, the UE may a first prioritized list of the plurality of prioritized lists based on geographic location of the UE.

In 1310, the UE, in response to detecting that received signal strength from the first cell is below a threshold, may use the geographic location and second data structure to select a second cell and attempt to connect to the second cell. The second cell may be operated (or owned and operated) by a second carrier. The UE may have a subscription to use services of the second carrier and may additionally store a SIM profile identity (e.g., an eUICC profile ID) associated with the second carrier. In some embodiments, the UE may use a second profile identity when communicating with the second carrier, wherein the second profile identity is associated with the second subscription.

FIG. 13B illustrates an example of a processing element including modules for dynamically selecting a new cell for communication in a cellular network based on crowd-sourced information, according to some embodiments. In some embodiments, antenna 1335 may be coupled (directly or indirectly) to processing element 1364. The processing element may be configured to perform the method described above in reference to FIG. 13A. In some embodiments, processing element 1364 may include one or more modules, such as modules (or circuitry) 1332-1330, and the modules (or circuitry) may be configured to perform various operations of the method described above in reference to FIG. 13A. In some embodiments, the processing element may be included in a UE, such as UE 106. As shown, the modules may be configured as follows.

In some embodiments, processing element 1364 may include a track module 1322 configured to track received signal strength from a first cell currently connected to a UE. In other words, track module 1322 may monitor and/or log received signal strength from the first cell (or a base station in the first cell) on which the UE is currently camped. The first cell may be operated (or owned and operated) be a first carrier. The UE may be associated with a subscription that allows (or enables) the UE to use services of the first carrier and may additionally store a SIM profile identity (e.g., an eUICC profile ID) associated with the first carrier. In some embodiments, the UE may use a first profile identity when communicating with the first carrier, wherein the first profile identity is associated with the first subscription.

In some embodiments, processing element 1364 may include an associate module 1324 configured to associate the received signal strength with a geographic location of the UE. Thus, associate module 1324 may link the received signal strength from the first cell to a geographic location. The received signal strength and geographic location may be stored in a first data structure. The first data structure may be stored on the UE. Alternatively, or in addition, the first data structure may be stored on a companion UE that is connected to the UE via a local connection (such as WiFi, Bluetooth, or Bluetooth low energy, and so forth).

In some embodiments, processing element 1364 may include a send module 1326 configured to send the first data structure to a server. The first data structure may be sent periodically (e.g., at predetermined intervals), when requested by the server, and/or based on occurrence of various conditions, such as establishment of a local connection to a wireless access point or a companion UE, the first data structure reaching a size threshold, and so forth. The first data structure may be sent via a cellular connection, a WiFi connection, or via the companion UE. In other words, the first data structure may be stored and sent to the companion UE via a local connection and the companion UE may forward the first data structure to the server via a cellular or WiFi connection.

In some embodiments, processing element 1364 may include a receive module 1328 configured to receive a second data structure from the server. The second data structure may be received periodically (e.g., at predetermined intervals), when requested, and/or based on occurrence of various conditions, such as establishment of a local connection to a wireless access point or a companion UE, the first data structure reaching a size threshold, and so forth. The second data structure may be received over a cellular or WiFi connection. In some embodiments, the companion UE may receive the second data structure and send it to the UE via a local connection. The second data structure may include information based on received signal strength at geographic locations compiled from a plurality of UEs, including the UE. In other words, the second data structure may include crowd-sourced data compiled from a plurality of UEs sending first data structures to the server.

In some embodiments, the information may include a prioritized list of public land mobile networks (PLMNs) (e.g., a prioritized LUT as described herein). In some embodiments, the PLMNs may be prioritized based on signal strength at a geographic location. The prioritized list of PLMNs may include PLMNs from carriers for which the UE has an associated subscription.

In some embodiments, the information may include a plurality of prioritized lists of PLMNs and each prioritized list may include PLMNs associated with one of a particular geographic location, a particular geographic zone, or a particular geographic region. In other words, each PLMN list (or prioritized LUT as described herein), may be associated with a particular region. The region may be a location (e.g., a particular location with a specified distance of the UE), a zone (e.g. a city, a county, or a state), or a region (e.g., a plurality of cities, a metropolitan area, one or more states, and so forth). In some embodiments, the UE may a first prioritized list of the plurality of prioritized lists based on geographic location of the UE.

In some embodiments, processing element 1364 may include a select module 1330 configured to select a second cell and attempt to connect to the second cell in response to detecting that received signal strength from the first cell is below a threshold. Select module 1330 may use the geographic location and second data structure to select the second cell. The second cell may be operated (or owned and operated) by a second carrier. The UE may have a subscription to use services of the second carrier and may additionally store a SIM profile identity (e.g., an eUICC profile ID) associated with the second carrier. In some embodiments, the UE may use a second profile identity when communicating with the second carrier, wherein the second profile identity is associated with the second subscription.

It is apparent for those skilled in the art that, for the particular processes of the modules (or circuitry) described above (such as modules 1322, 1324, 1326, 1328, and 1330), reference may be made to the corresponding operations (such as operations 1302, 1304, 1306, 1308, and 1310, respectively) in the related process embodiment sharing the same concept and the reference is regarded as the disclosure of the related modules (or circuitry) as well. Furthermore, processing element 1364 may be implemented in software, hardware or combination thereof. More specifically, processing element 1364 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1364 may be implemented as a general-purpose processor such as a CPU, and therefore each module can be implemented with the CPU executing instructions stored in a memory which perform a respective operation.

Further Embodiments

In some embodiments, a user equipment (UE) may comprise at least one antenna, a radio coupled to the at least one antenna for performing wireless cellular communications, and at least one processing element coupled to the radio. The UE may be configured to connect to a base station of a first cell in a first cellular network associated with a first carrier, wherein the UE is link budget limited, and wherein the UE is associated with one or more subscriptions to the first carrier and at least one additional carrier; determine signal strength of a received signal from the first cell is below a first threshold; and initiate a search for a second cell, wherein the second cell is in a second cellular network associated with the at least one additional carrier.

In some embodiments, the search may be based at least in part on a location of the UE and signal strength data associated with the location of the UE. In some embodiments, the signal strength data may be stored in a data structure on the UE. In some embodiments, the signal strength data may be retrieved from a data structure stored on a companion UE communicatively coupled to the UE.

In some embodiments, the search may be based at least in part on a location of the UE and crowd-sourced signal strength data associated with the location of the UE. In some embodiments, the crowd-sourced signal strength data may be retrieved from a server. In some embodiments, the crowd-sourced signal strength data may be comprised in a data structure, wherein the data structure may be updated at a server, wherein the UE may be further configured to receive an updated data structure from the server. In addition, to receive the updated data structure from the server, the UE may be further configured to receive the updated data structure via a local connection with a companion UE and/or via the base station.

In some embodiments, the crowd-sourced signal strength data may be received via one or more local connections with one or more neighboring UEs.

In some embodiments, the UE may be further configured to track signal strength for one or more cells at or within a specified range of a geographic location; associate the signal strength for each of the one or more cells to the geographic location; and transmit the associated signal strengths for each of the one or more cells to a server.

In some embodiments, the UE may be further configured to track location of the UE and received signal strength from the first cell; associate the location of the UE to the received signal strength from the first cell; and transmit the received signal strength and associated location to the server.

In some embodiments, the UE may further comprise at least one SIM device coupled to the at least one processor, wherein the at least one SIM device includes a profile identity associated with each carrier for which the UE has a subscription. The UE may be further configured to select a first profile identity for connection with the first carrier, wherein the first profile identity may be associated with the first carrier; and select a second profile identity for connection with the at least one additional carrier, wherein the second profile identity may be associated with the second carrier.

In some embodiments, the at least one SIM device may be an eSIM device. In some embodiments, the UE may receive charges from each carrier for which the UE has a subscription.

In some embodiments, the received signal strength from the second cell may be above a second threshold.

In some embodiments, the UE may be further configured to determine that a received signal strength from the second cell may be below a second threshold; and initiate a search for a third cell, wherein the third cell may be in either the first or second cellular network.

In some embodiments, the UE may be further configured to attempt to connect to the second cell; and in response to failing to connect to the second cell, initiate a search for a third cell, wherein the third cell may be in either the first or second cellular network.

In some embodiments, the UE may be a wearable device.
In some embodiments, the UE may be a smart watch.
In some embodiments, a user equipment (UE) may include at least one antenna, a radio coupled to the at least one antenna for performing wireless cellular communications, at least one SIM device, and at least one processing element coupled to the radio. The UE may be configured to store a public land mobile network (PLMN) eSIM priority look up table (LUT); sort the priority LUT based at least in part on a PLMN priority order; and update the priority LUT at runtime based at least in part on one or more factors.

In some embodiments, the one or more factors may include at least one of user subscription preference, crowed sourced coverage map, and steering policy based on business relationship between a UE manufacturer and a carrier.

In some embodiments, each entry in the priority LUT may specify one or more allowed SIM profile identities.

In some embodiments, the priority LUT may specify available SIM profiles usable to register for service on a carrier.

In some embodiments, the UE may be a wearable device.
In some embodiments, wherein the UE may be a smart watch.

In some embodiments, a user equipment (UE) may include at least one antenna, a radio coupled to the at least one antenna for performing wireless cellular communications, and at least one processing element coupled to the radio. The UE may be configured to connect to a base station of a host public land mobile network (PLMN); trigger a packet switched cell reselection in response to the host PLMN dropping below a threshold; search for a most preferred PLMN that meets an inter-PLMN selection threshold; and attempt to connect to the most preferred PLMN.

In some embodiments, the host PLMN and the most preferred PLMN may be associated with different cellular network providers.

In some embodiments, the host PLMN and the most preferred PLMN may be associated with different carriers.

In some embodiments, the most preferred PLMN may be determined based on a query of a priority look up table (LUT) stored on the UE. In some embodiments, an order of PLMNs in the priority LUT may be based at least in part on crowd-sourced signal strength data associated with a location of the UE. In some embodiments, the priority LUT may specify available SIM profiles usable to register for service on a carrier.

In some embodiments, the UE may be a wearable device.
In some embodiments, the UE may be a smart watch.
In some embodiments, the UE may further include at least one SIM device, wherein the at least one SIM device may be coupled to the at least one processor, and wherein the at least one SIM device includes a profile identity associated with each carrier for which the UE has a subscription. The UE may be further configured to select a first profile identity for connection with a first carrier associated with the host PLMN, wherein the first profile identity may be associated with the first carrier; and select a second profile identity for connection with the at least one additional carrier associated with the most preferred PLMN, wherein the second profile identity may be associated with the second carrier. In some embodiments, the at least one SIM device may be an eSIM device.

In some embodiments, a user equipment (UE) may include at least one antenna, a radio coupled to the at least one antenna for performing wireless cellular communications, and at least one processing element coupled to the radio. The UE may be configured to associate received signal strength from a first cell currently connected to the UE to a geographic location of the UE, wherein the first cell may be associated with a first carrier, wherein the received signal strength and geographic location are stored in a first data structure; send the first data structure to a server; receive a second data structure from the server, wherein the second data structure includes information based on received signal strength at geographic locations compiled from a plurality of UEs; in response to detecting that received signal strength from the first cell may be below a threshold, use the geographic location and second data structure to select a second cell, wherein the second cell may be associated with a second carrier; and attempt to connect to the second cell.

In some embodiments, the UE may be associated with a first subscription with the first carrier, and wherein the UE may be associated with a second subscription with the second carrier, wherein the UE may be further configured to use a first profile identity when communicating with the first carrier, wherein the first profile identity may be associated with the first subscription; and use a second profile identity when communicating with the second carrier, wherein the second profile identity may be associated with the second subscription.

In some embodiments, to send the first data structure to the server, the UE may be further configured to send the first data structure, via a local connection, to a companion UE.

In some embodiments, to receive the second data structure from the server, the UE may be further configured to receive the second data structure, via a local connection, from a companion UE.

In some embodiments, the information may comprise a prioritized list of public land mobile networks (PLMNs). In some embodiments, the PLMNs may be prioritized based on signal strength at a geographic location. In some embodiments, the prioritized list of PLMNs may include PLMNs from carriers for which the UE has an associated subscription.

In some embodiments, the information may comprise a plurality of prioritized lists of public land mobile networks (PLMNs), wherein each prioritized list includes PLMNs associated with one of a particular geographic location, a particular geographic zone, or a particular geographic region. In some embodiments, the UE may be further configured to determine a first prioritized list of the plurality of prioritized lists based on geographic location of the UE.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
at least one antenna;
a radio coupled to the at least one antenna for performing packet switched wireless cellular communications;
a SIM device coupled to the at least one processor, wherein the SIM device includes a profile identity associated with each carrier for which the UE has a subscription;
at least one processing element coupled to the radio and the SIM device;
wherein the UE is configured to:
select a first profile identity for connection with the first carrier, wherein the first profile identity is associated with the first carrier;
connect to a base station of a first cell in a first cellular network associated with the first carrier, wherein the UE is link budget limited, having limited reception and transmission capabilities, wherein the first cell operates according to a first packet switched radio access technology (RAT), and wherein the UE is associated with one or more subscriptions to the first carrier and at least one additional carrier;
determine that a reference signal received power (RSRP) of the first cell is below a first threshold, wherein the first threshold is based on the UE being link budget limited;
initiate, responsive to the RSRP being below the first threshold, a search for a second cell, wherein the second cell is in a second cellular network associated with the at least one additional carrier, and wherein the second cell operates according to the first RAT;
select a second profile identity for connection with the at least one additional carrier, wherein the second profile identity is associated with the second carrier; and
attempt to connect to the second cell.

2. The UE of claim 1,
wherein the search is based at least in part on a location of the UE and RSRP data associated with the location of the UE.

3. The UE of claim 2,
wherein the RSRP data is stored in a data structure on the UE.

4. The UE of claim 2,
wherein the RSRP data is retrieved from a data structure stored on a companion UE communicatively coupled to the UE.

5. The UE of claim 1,
wherein the search is based at least in part on a location of the UE and crowd-sourced RSRP data associated with the location of the UE.

6. The UE of claim 5,
wherein the crowd-sourced RSRP data is comprised in a data structure, wherein the data structure is updated at a server, wherein the UE is further configured to:
receive an updated data structure from the server.

7. The UE of claim 6,
wherein to receive the updated data structure from the server, the UE is further configured to:
receive the updated data structure via a local connection with a companion UE and/or via the base station.

8. The UE of claim 1,
wherein the first threshold is −105 decibel-milliwatts (dBm).

9. An apparatus, comprising:
a memory; and
a processing element in communication with the memory, wherein the processing element is configured to:
store a public land mobile network (PLMN) eSIM priority look up table (LUT);
sort the priority LUT based at least in part on a PLMN priority order;
update the priority LUT at runtime based at least in part on one or more factors, wherein the one or more factors include at least one of user subscription preference, crowd-sourced coverage map, and steering policy based on business relationship between a UE manufacturer and a carrier;
associate a reference signal received power (RSRP) from a first cell to a geographic location of the apparatus, wherein the first cell is associated with a first carrier, wherein a first profile identity associated with the first carrier is included on a SIM device in communication with the processing element, wherein the first cell operates according to a first radio access technology (RAT), and wherein the RSRP and geographic location are stored in a first data structure and transmitted to a server;

receive a second data structure from the server, wherein the second data structure includes information based on RSRP at geographic locations compiled from a plurality of UEs;
in response to detecting that RSRP from the first cell is below a threshold, generate instructions to perform a PLMN search to select a second cell, wherein the PLMN search is based, at least in part, on one or more of the geographic location, the second data structure, or the updated priority LUT, wherein the second cell is associated with a second carrier, wherein a second profile identity associated with the second carrier is included on the SIM device in communication with the processing element, wherein the threshold is associated with link budget limited devices, and wherein the second cell operates according to the first RAT; and
generate instructions to attempt to connect to the second cell using the second profile identity.

10. The apparatus of claim 9,
wherein each entry in the priority LUT specifies one or more allowed SIM profile identities.

11. The apparatus of claim 9,
wherein the priority LUT specifies available SIM profiles usable to register for service on a carrier.

12. The apparatus of claim 9,
wherein the apparatus is comprised in a wearable device.

13. The apparatus of claim 9,
wherein to receive the second data structure from the server, the processing element is further configured to:
receive the second data structure via a local connection with a companion device, wherein the local connection includes one of a Bluetooth connection or a WiFi connection.

14. A non-transitory computer readable memory medium storing program instructions executable by a processor of a user equipment device (UE) to:
associate reference signal received power (RSRP) from a first cell currently connected to a UE to a geographic location of the UE, wherein the UE has limited reception and transmission capabilities, wherein the first cell operates according to a first radio access technology (RAT), wherein the first cell is associated with a first carrier, wherein the UE is associated with a first subscription with the first carrier, wherein a first profile identity associated with the first carrier is included on a SIM device in communication with the processor, wherein the UE connects to the first cell using the first profile identity, wherein the threshold is based on the UE having limited reception and transmission capabilities, and wherein the RSRP and geographic location are stored in a first data structure;
generate instructions to transmit the first data structure to a server;
receive a second data structure from the server, wherein the second data structure includes information based on RSRP at geographic locations compiled from a plurality of UEs;
in response to detecting that RSRP from the first cell is below a threshold, use the geographic location and second data structure to generate instructions to select a second cell, wherein the second cell is associated with a second carrier, wherein the UE is associated with a second subscription with the second carrier, wherein a second profile identity associated with the second carrier is included on the SIM device in communication with the processing element, and wherein the second cell operates according to the first RAT; and
generate instructions to attempt to connect to the second cell using the second profile identity.

15. The non-transitory computer readable memory medium of claim 14,
wherein to generate instructions to transmit the first data structure to the server, the program instructions are further executable to:
generate instructions to transmit the first data structure, via a local connection, to a companion UE.

16. The non-transitory computer readable memory medium of claim 14,
wherein to receive the second data structure from the server, the program instructions are further executable to:
receive the second data structure, via a local connection, from a companion UE.

17. The non-transitory computer readable memory medium of claim 14,
wherein the information comprises a plurality of prioritized lists of public land mobile networks (PLMNs), wherein each prioritized list includes PLMNs associated with one of a particular geographic location, a particular geographic zone, or a particular geographic region.

18. The non-transitory computer readable memory medium of claim 17,
wherein the program instructions are further executable to determine a first prioritized list of the plurality of prioritized lists based on geographic location of the UE.

19. The non-transitory computer readable memory medium of claim 17,
wherein the plurality of prioritized lists of PLMNs includes PLMNs from carriers for with the UE has an associated subscription.

20. The non-transitory computer readable memory medium of claim 15,
wherein the local connection includes one of a Bluetooth connection or a WiFi connection.

* * * * *